United States Patent
Ilic et al.

(10) Patent No.: US 10,656,609 B2
(45) Date of Patent: May 19, 2020

(54) PLUG-AND-PLAY RECONFIGURABLE ELECTRIC POWER MICROGRIDS

(71) Applicant: Massachusetts Institute of Technology, Cambridge, MA (US)

(72) Inventors: Marija Ilic, Sudbury, MA (US); Xia Miao, Cambridge, MA (US); Rupamathi Jaddivada, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 131 days.

(21) Appl. No.: 15/965,823

(22) Filed: Apr. 27, 2018

(65) Prior Publication Data

US 2018/0314217 A1 Nov. 1, 2018

Related U.S. Application Data

(60) Provisional application No. 62/490,746, filed on Apr. 27, 2017.

(51) Int. Cl.
*G05B 17/02* (2006.01)
*H02M 7/5387* (2007.01)
*H02M 7/537* (2006.01)
*H02M 1/00* (2006.01)

(52) U.S. Cl.
CPC ........ *G05B 17/02* (2013.01); *H02M 7/53871* (2013.01); *H02M 7/537* (2013.01); *H02M 2001/0019* (2013.01); *H02M 2001/0022* (2013.01)

(58) Field of Classification Search
None
See application file for complete search history.

(56) References Cited

U.S. PATENT DOCUMENTS

| | | | |
|---|---|---|---|
| 5,483,147 A | 1/1996 | Ilic et al. | |
| 5,517,422 A | 5/1996 | Ilic et al. | |
| 5,698,968 A * | 12/1997 | Takagi | H02P 9/105 322/58 |
| 8,738,191 B2 | 5/2014 | Aivaliotis et al. | |
| 9,054,531 B2 | 6/2015 | Ilic et al. | |
| 9,257,845 B2 * | 2/2016 | Alonso Sadaba | F03D 7/0284 |
| 9,625,887 B2 | 4/2017 | Ilic et al. | |
| 2004/0215348 A1 | 10/2004 | Ilic et al. | |
| 2008/0143304 A1 | 6/2008 | Bose et al. | |

(Continued)

OTHER PUBLICATIONS

PCT International Search Report of the ISA for PCT No. PCT/US2018/030042 dated Jul. 20, 2018; 4 pages.

(Continued)

*Primary Examiner* — Ryan A Jarrett
(74) *Attorney, Agent, or Firm* — Daly, Crowley, Mofford & Durkee LLP

(57) ABSTRACT

Described are concepts, systems and methods for operating microgrid systems both during normal operation conditions and during sudden, unexpected occurrences of a fault which results in a source becoming disconnected from a primary supply. This is achieved through control systems and method based upon multi-layered modeling of system controllable components and their interactions. This approach results in controllable components capable of operation in a "plug-and-play" manner.

16 Claims, 17 Drawing Sheets

(56) References Cited

U.S. PATENT DOCUMENTS

| | | | |
|---|---|---|---|
| 2010/0049455 A1* | 2/2010 | Scholtz | H02P 9/105 |
| | | | 702/60 |
| 2012/0013322 A1 | 1/2012 | Dearborn | |
| 2012/0083930 A1 | 4/2012 | Ilic et al. | |
| 2012/0101640 A1 | 4/2012 | Stapelfeldt | |
| 2012/0259477 A1 | 10/2012 | Abido et al. | |
| 2013/0166084 A1 | 6/2013 | Sedighy et al. | |
| 2014/0249686 A1 | 9/2014 | Brainard et al. | |
| 2014/0371940 A1 | 12/2014 | Ilic et al. | |
| 2015/0162750 A1 | 6/2015 | Varma | |
| 2015/0289785 A1 | 10/2015 | Bojovic et al. | |
| 2015/0346751 A1* | 12/2015 | Hou | G05F 1/625 |
| | | | 323/234 |
| 2016/0042377 A1 | 2/2016 | Ilic et al. | |
| 2016/0373025 A1* | 12/2016 | Mascioli | H02M 7/537 |
| 2018/0083549 A1* | 3/2018 | Yao | H02M 7/12 |
| 2019/0271998 A1* | 9/2019 | Sisson | G05F 1/468 |

OTHER PUBLICATIONS

PCT Written Opinion of the ISA for PCT No. PCT/US2018/030042 dated Jul. 20, 2018; 6 pages.

International Preliminary Report on Patentability dated Nov. 7, 2019 for International Application No. PCT/US2018/030042; 8 pages.

Andersson, et al.; "Network System Engineering for Meeting the Enemy and Environmental Dream;" Proceedings of the IEEE, vol. 99; No, 1; Jan. 2011; pp. 7-14 (8 pages).

* cited by examiner

PLUG-AND-PLAY RECONFIGURABLE ELECTRIC POWER MICROGRIDS

CROSS REFERENCE TO RELATED APPLICATION

This application claims the benefit of U.S. Provisional Application No. 62/490,746 filed Apr. 27, 2017, titled "PLUG-AND-PLAY RECONFIGURABLE ELECTRIC POWER MICROGRIDS," which application is incorporated by reference herein in its entirety.

GOVERNMENT RIGHTS

This invention was made with Government support under Contract No. FA8702-15-D-0001 awarded by the U.S. Air Force. The Government has certain rights in the invention.

BACKGROUND

For purposes of introducing basic concepts, consider the illustrative microgrids of FIGS. 1 and 1A. In FIG. 1, a microgrid comprises a conventional small diesel generator located at network node 1 and connected to a photo-voltaic (PV) panel (also sometimes referred to herein as a "solar panel") located at network node 2. The same microgrid as that shown in FIG. 1 with a very large generator at node 1 may thus represent, for example, a utility grid connected via node 2 to a small PV panel with its local load. Opening of a switch S represents a sudden fault which results in the PV panel becoming disconnected from the main utility.

FIG. 1A illustrates a stand-alone microgrid having mixed generation sources here illustrated as diesel generation (for example) and solar power. The open switch S indicates a fault (e.g. a sudden and unexpected fault) leading to "islanded" operation of the PV panel. In this scenario, the PV panel must supply its own load and the rest of the load in this example being supplied by a conventional diesel generator (designated as "induction machine" in FIG. 1A). Loads themselves could be diverse and range from constant impedance loads, through common induction motors and variable speed drive motors having their own internal control. Thus, such faults may result in a variation of current flowing out of a PV panel.

It is known that power produced by a solar panel may vary due to a variety of factors including, but not limited to environmental factors (e.g. clouds, rain, etc. . . . ). A typical solar irradiance power output from an illustrative solar panel (which may be the same as or similar to the solar panels described in FIGS. 1, 1A) is shown in FIG. 2. As the current out of a PV panel varies, a PV controller and diesel generator controller must respond to balance the power produced at the respective sources (i.e. the PV panel and induction machine) and the load demand at nodes 1 and 2. A DC/AC PV inverter controller is shown in FIG. 3.

As is known, it is problematic to operate microgrid systems such as those shown in FIGS. 1, 1A both during normal operation and during sudden opening and closing of switch S (i.e. during sudden and unexpected disconnection and reconnection of the PV panel to a utility grid, for example).

This is fundamentally a very difficult control design problem because it concerns operations of highly dynamical nonlinear network systems where topology may change as a of result of switching. This means that the system could have multiple equilibria, some being stable and within acceptable engineering ranges, and others completely non-feasible.

SUMMARY

The concepts, systems and methods described herein are a solution to the problem of operating microgrid systems both during normal operation conditions and during sudden, unexpected occurrences of a fault which results in a source (e.g. a PV panel) becoming disconnected from a main utility or other primary supply (i.e. as represented by the opening and closing of switch S in FIGS. 1, 1A).

In accordance with one aspect of the concepts described herein, a method of controlling a component which receives an input signal and produces an output signal includes (a) in response to a change in the input signal, generating a first value corresponding to a disturbance value (m), a second value corresponding to a rate of change of the disturbance value (m), a third value corresponding to a second voltage magnitude quantity (V); (b) in response to receiving the first, second, third and fourth values: (b1) generating a reference power point ($P^{ref}$) corresponding to an amount of power to be produced to maintain a voltage within a predetermined voltage range about a reference voltage ($V^{ref}$); and (b2) generating a feedback signal $\mathcal{V}$ needed to stabilize electrical power produced by the component to produce the value of reference power point $P^{ref}$.

In accordance with a further aspect of the concepts, systems and methods described herein, an electric power microgrid is considered as an interconnection of vastly different technical components interacting dynamically in response to large deviations in system inputs and topological changes.

In embodiments, techniques described herein provide a systematic approach to: (a) setting plug-and-play specifications for any given module (component or group of components) which is to be connected to an electric power microgrid; specifications utilize physics-based novel unified modeling of typical heterogeneous microgrid components; (b) designing local automated sensing and feedback control apparatus which ensures that stand alone components can meet plug-and-play specifications; (c) distributed adjustments of components to signals from neighboring components for cooperative operation of the interconnected electric power microgrid system (with the distributed adjustment being based on models derived from general laws of physics in an interconnected network system); and (d) a minimally coordinated system management of interconnected electric power microgrid system which provides control signals to individual modules which are tuned to meet plug-and-play specifications.

BRIEF DESCRIPTION OF THE DRAWINGS

The foregoing features may be more fully understood from the following description of the drawings in which.

DETAILED DESCRIPTION

In general overview, described is a control design approach which is based upon multi-layered modeling of system controllable components and their interactions. This approach results in controllable components capable of operation in a "plug-and-play" manner.

In a system of N controllable components, lower-layer models of each controllable component i (where i is an index from 1-N) are technology-specific and can be expressed in terms of internal states $x_i(t)$ internal feedback control $u_i(t)$ and disturbances $m_i(t)$. In an interconnected network (i.e. a network formed from one or more interconnected components or interconnected microgrids) disturbances could be both local (e.g. local to a particular controllable component or a particular microgrid) and/or created by dynamic interactions among components (either controllable or not) to which the controllable component is coupled (sometimes referred to herein as "external" or "load" disturbances).

In accordance with the concepts described herein, it has been recognized that it is generally difficult to specify disturbances in terms of actual physical variables (such as current and voltages, for example) in a manner which allows for desired control. Thus, in accordance with the concepts described herein, it has been found that specifying disturbances (local and/or external disturbances) in terms of ranges of power, ranges of rate of power changes, and ranges of energy changes for the particular operating time interval of interest.

Figure 4:
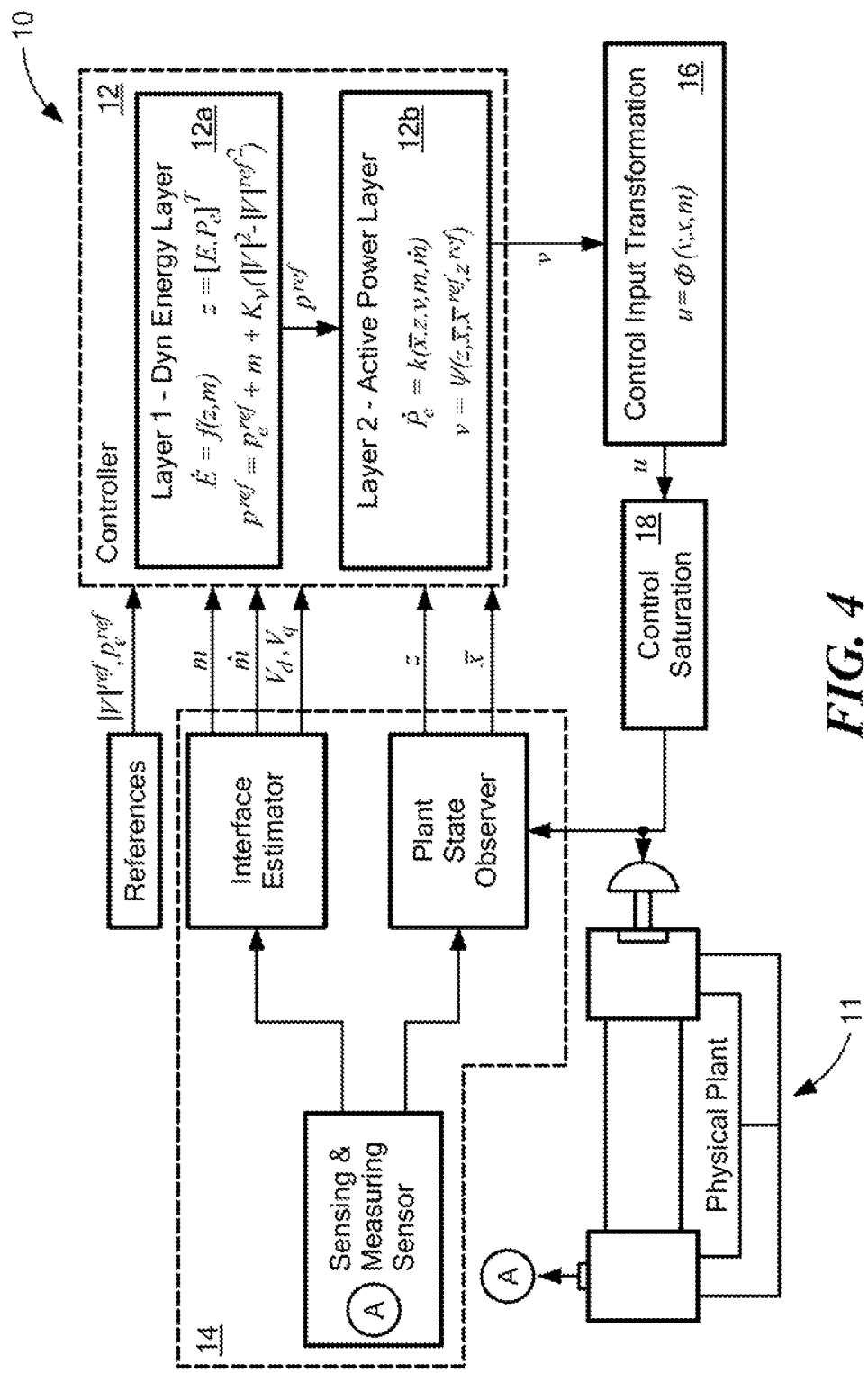
FIG. 4 is a block diagram of a dynamic module in closed loop with input and output specifications corresponding to FIG. 4C.
Figure 4A:
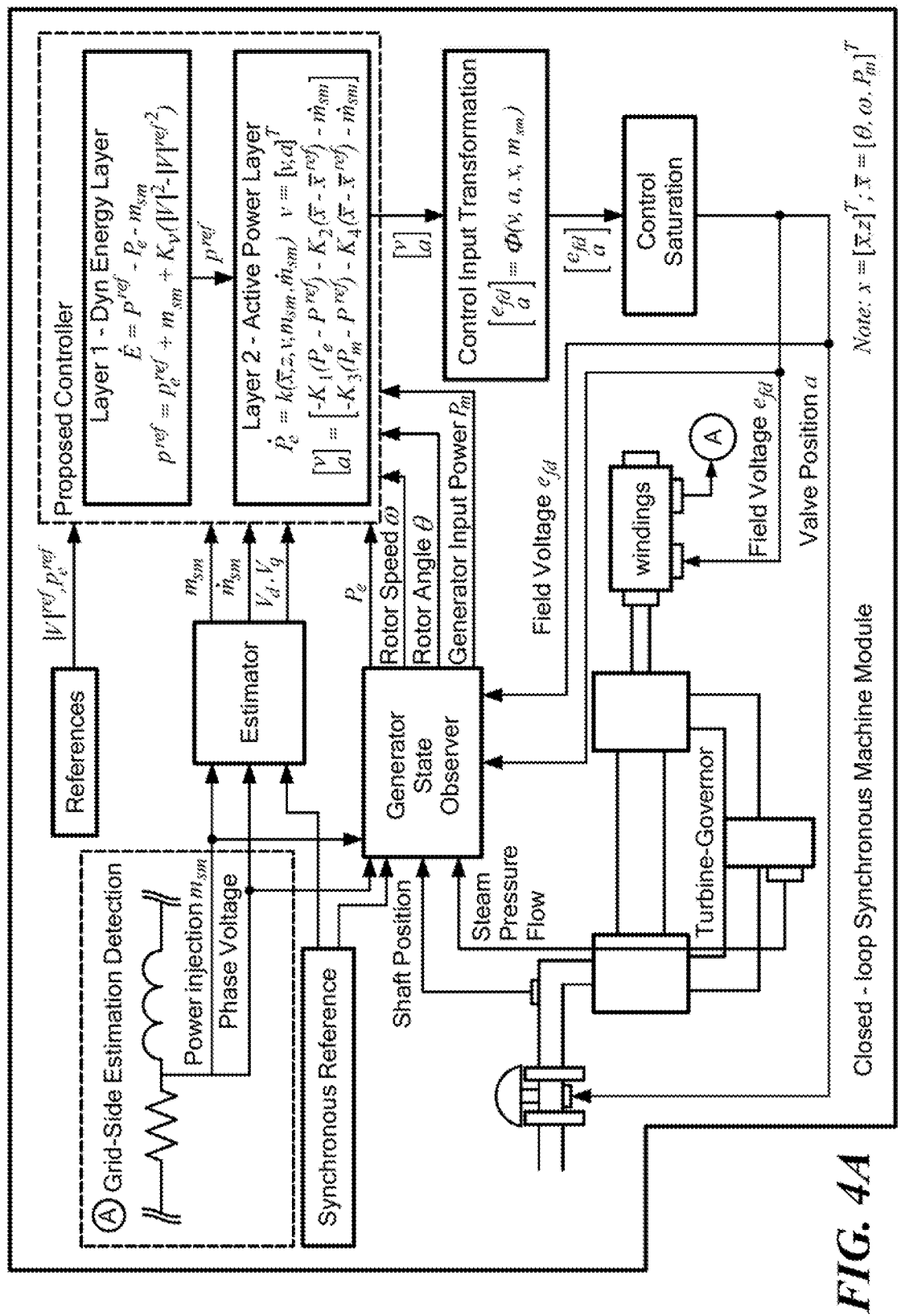
FIG. 4A is a block diagram of a power electronics (exciter) and governor controlled synchronous machine.
Figure 4B:
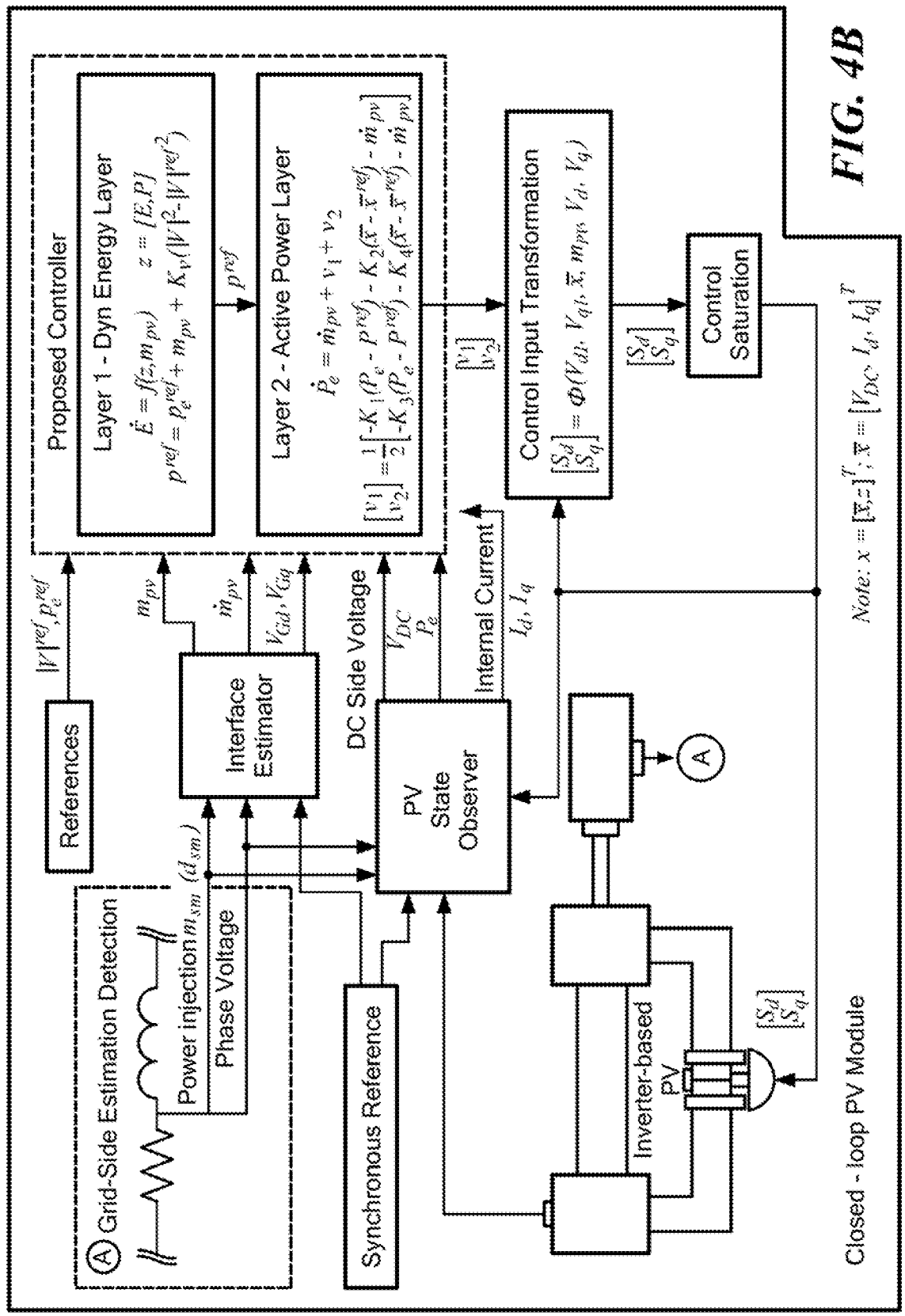
FIG. 4B is a block diagram of a power electronics-controlled PV system.
Figure 4C:
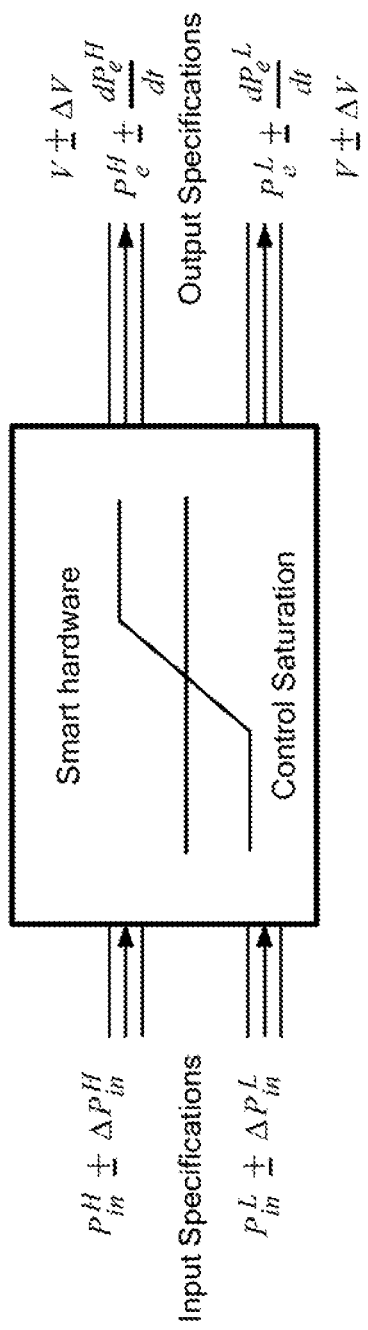
FIG. 4C is a block diagram illustrating input measurements and signal processing in the controlled component.

Referring now to FIG. 4C, each controllable component has technology-agnostic input output specification on $P_{in}(t)$, $$\dot{P}_{in}(t) = \frac{P_{in}^H(t) - P_{in}^L(t)}{\Delta t}$$

which are subject to general power flow laws. When creating plug-and-play based microgrids, it is not necessary to differentiate technologies specs.

Each technology also has a technology-agnostic output specifications on electrical power $P_e(t)$, and rate of change of electrical power $$\dot{P}_e(t) = \frac{P_e^H - P_e^L}{\Delta t},$$

and notably, output specifications on terminal voltage magnitude $V+\Delta V$.

It is important to observe that plug-and-play control protocols in microgrids based upon these specifications only require that all components be characterized in terms of common input-output (I-O) variables. Not all of them have to control the same ranges, this sets the basis for flexible plug-and-play protocols and overcoming rigid standardizations.

In accordance with the concepts described herein, it has been recognized that by utilizing a transformed state space (i.e. the recognition that one can specify disturbances in terms of ranges of power, ranges of rate of power changes, and ranges of energy changes for a particular operating time interval of interest rather than by specifying disturbances created in terms of actual physical variables, such as current and voltages) and proper design control, it is possible to meet input/output specifications shown in FIG. 4C of a controllable component in provable way.

It is well recognized that component control which maintains voltage within a desired range of a desired reference voltage ($V^{ref}$) is difficult to implement when loading changes. This is particularly true when loading is supplied by devices or systems (e.g. synchronous machines or PVs) which may create near short circuit current or when output impedances seen by components are almost zero.

It should be noted that the transformed state space utilizes ranges of power, ranges of rate of power changes, and ranges of energy changes for the particular operating time interval of interest, instead of using actual physical variables, such as current and voltages. Thus, using the transformed state space to specify disturbances (local and/or external disturbances) and to design the control, the control systems, devices and techniques described herein may be used.

Given the specifications on ranges of power and ranges of rate of change of power disturbances presented to (or "seen") by a component, a nonlinear controller may be provided which ensures the ranges of output power at certain ranges of rate of change of power and to maintain voltage at its terminal within the pre-specified ranges close to nominal voltage.

A general closed-loop dynamic model in transformed state space will next be described in conjunction with FIG. 4.

Referring now to FIG. 4, an illustrative closed-loop module 10, includes a component 11, here illustrated as a physical plant. Component 11 is controlled via a control system including a controller 12. The component may, for example, correspond to a photovoltaic (PV) panel (or more simply a solar panel) a synchronous machine, an induction machine, inverter-interfaced system or other physical plant. The component provides an output (designated A in FIG. 4). The system further includes a sensing and measurement system 14 which measures a disturbance (m), a rate of change of the disturbance (designated ṁ) a first (or direct) voltage ($v_d$), a second (or quadrature) voltage $v_q$. Sensing and measurement system 14 also produces at least one state variable of the component in a transformed state space (designated z) and an observed state of the control (e.g. an internal state or characteristic of the component such as frequency).

In embodiments, the sensing and measurement system comprises a sensor, an interface estimator and a component (or plant) state observer. The sensor may be provided as any type of measuring device selected to suit the needs of a particular application. Those of ordinary skill in the art will appreciate how to select a particular type of sensor for use with a particular type of controllable component. The interface estimator estimates interaction due to both input perturbances (e.g. a particular type of local disturbance) and interaction of the component (e.g. coupling to a power grid, which may be considered as a particular type of external disturbance). The interface estimator takes into account characteristics such as delay. The sensing and measurement system may be implemented, at least in part, in a processing device (e.g. a digital signal processor (DSP), application specific integrated circuit (ASIC) or other processing device).

It should be appreciated that disturbances (designated as m) may be due to input or output mechanisms. For example, if the component is a solar panel, then the input would be solar radiation, (i.e. a source of energy for the component). A disturbance (m) in solar radiation may be caused, for example, by a passing cloud. An output disturbance may be caused for example, by coupling the solar panel (or more generally a PV component) to an electrical grid. That is, the connecting of the component to the grid may cause a disturbance in the component output (in this case designated as A). The disturbance value (m), the rate of change of the disturbance value (ṁ) and the first and second voltage quantities ($v_d$, $d_q$), as well as the state variable in observed state information z, x̄ are provided to a controller.

The controller 12 includes a dynamic energy layer 12a and an active power layer 12b each of which may be implemented in a processing device (e.g. a digital signal processor (DSP), application specific integrated circuit (ASIC) or other processing device). In response to receiving the disturbance value (m) the rate of change of the disturbance value (ṁ) and the first and second voltage quantities ($v_d$, $v_q$), the dynamic energy layer generates a reference power point value $P^{ref}$ corresponding to amount of power which needs to be produced to maintain a terminal voltage of the component within a predetermined voltage range about a reference voltage $V^{ref}$. The reference power point value $P^{ref}$ is provided to the active power layer which generates a feedback signal $\mathcal{V}$. The feedback signal $\mathcal{V}$ is needed to stabilize electrical power produced by the component to produce the value $P^{ref}$. The feedback signal $\mathcal{V}$ is provided to a control input transformation processor 16. The control input transformation processor receives the control signal provided thereto and performs a mapping of $\mathcal{V}$ x, m to a physical control signal designated u. The physical control signal u is provided to a control saturation processor 18 which determines actual ranges of $P^{ref}$ and $V^{ref}$ over which control of the component 11 can be maintained. The output of the control saturation processor is provided to the component as well as to the plant state observer. Thus, with the above-described control scheme, controller 11 is provided as a controllable component. That is using the control devices and control techniques described herein (e.g. as implemented, at least in part via controller 12), a conventional component can be changed into a controllable component.

Referring now to FIG. 4A, a synchronous machine component in closed loop is shown. The general principal of control is the same as that described in FIG. 4.

Referring now to FIG. 4B, a PV system in a closed loop is shown. The general principal of control is the same as that described in FIG. 4.

Referring now to FIG. 4C, the control scheme described above may be implemented as a nonlinear controller configured to ensure ranges of output power at certain ranges of rate of change of power and to maintain voltage at its terminal within the pre-specified ranges close to nominal voltage.

As described above in conjunction with FIG. 4, the controller 12 and associated circuitry and processors may be implemented inside (i.e. as part of) the controllable component 11. As also noted above, controller 12 comprises two layers: active power control layer and dynamic energy layer. The active power control layer aims at controlling instantaneous power, while the dynamic energy layer regulates the energy. In addition, the terminal voltage could also be maintained within a feasible region via dynamic energy layer. It should be noted that in the transformed state space, $P_i$ is a part of the rate of change of incremental stored energy E dynamics, indicating there is a natural time scale separation between the active power layer and the dynamic energy layer.

At a modular level, component's interaction variable $z_i = [P_{ei}, E_i]^T$ is controlled to stay within a certain range determined by $[\dot{P}_{ei,min}, \dot{P}_{ei,max}]$. It should be noted that the range of $\dot{P}_i$ is derived and limited by the control capacity of physical controllers.

A dynamic energy layer model and design will next be described. For any dynamical component, dynamic energy layer model could be derived using the conservation of power:

$$\dot{E}_t = P_{net} = P_i - P_{e,i} - P_{d,i} \tag{1}$$

From an energy point of view, any dynamical system is indeed controlled by injecting or draining energy through controllers. Thus, components comprising $P_{net}$ can be classified into two groups controllable and uncontrollable, respectively.

The controllable group are related with controllable energy resources like controller, while the rest reflects the uncontrollable energy conversion occurred inside the component, such as dissipation and interaction with neighbors.

Thus, without loss of generality, $P_i$ in Eqn (1) can be regulated to its set point $P_i^{ref}$ at a faster time scale via the active power layer. Consequently, $P_i$ becomes a control input at dynamic energy layer dynamics, and the dynamics may be approximated as:

$$\dot{E} = P_i^{ref} - P_{e,i} - P_{dis} \quad (2)$$

Considering that the proposed control is designed to control the interaction variables and the terminal voltage within certain ranges, at dynamic energy layer, one possible design is to design the set point $P_i^{ref}$ as the following form:

$$P_i^{ref} = P_{dis} + P_{e,i}^{ref} - (V_t^2 - (V_t^{ref})^2)$$

Therefore, the closed-loop dynamics becomes:

$$\dot{E} = -(P_e - P_e^{ref}) - (V_t^2 - (V_t^{ref})^2) \quad (3)$$

It is can be seen from Eqn. (3) that $P_e$ and $V_t$ will converge to $P_e^{ref}$ and $V_t^{ref}$ if system is stable.

It should be noted that the design of the secondary layer is quite flexible. Two techniques for plug-and-play setup have been developed: (1) distributed control through handshaking (handshaking leads to feasible equilibrium); and (2) near-optimal plug-and-play. These techniques require minimum coordination.

Real power layer model and control design will next be described. Real power layer model has the form as:

$$\dot{P}_{ei} = k(\bar{x}_i, z_i, m_i, u_i)$$

It should be noted that $P_i$ can be controlled by physical controllers. That is, $P_{ei}$ dynamics is a function of original input variable $u_i$. The above equations may be reorganized and written as:

$$\dot{P}_{ei} = f(\bar{x}_i, z_i, m_i) + g(\bar{x}, z_i, m_i) u_i$$

where $g(\bar{x}, z_i, m_i) \neq 0$

In original state space, control input $u_i$ may be expressed as:

$$u_i = \frac{-f(\bar{x}_i, z_i, m_i) + v_i}{g(\bar{x}, z_i, m_i)} \quad (4)$$

where $v_i$ is the control input in the transformed state space.

It should also be noted that Eq. (4) determines the unique transformation of control input between the original state space and the transformed state space. Then, the closed loop system in the transformed state space becomes:

$$\dot{P}_{ei} = v_i$$

It should also be noted that the closed-loop system is linear in transformed state space. This approach provides a lot of flexibility in control design. Well-established results in control theory for LTI system can be directly applied here. In addition, another advantage of the concepts, devices and control techniques described herein is that control with provable performance is no longer a challenge problem if the transformed state space modeling technique is used.

One straightforward linear technique is full-state state feedback control:

$$v_i = k_{gain1}(P_{ei} - P_i^{ref}) - k_{gain2}(\bar{x} - x^{ref})$$

where $k^{gain1}$ and $k_{gain2}$ are the feedback gains. $k_{gain1}$ and $k_{gain2}$ are chosen so that the closed-loop system matrix is Hurwitz. Meanwhile, $k_{gain1}$ and $k_{gain2}$ should be designed so that the convergence time of $P_{ei}$ is faster than the time scale of the dynamic energy layer dynamics.

As noted above, the general closed-loop dynamic model in transformed state space is shown in FIG. 4. Depending on the component technology and control design, different components are capable of meeting different specifications ranges. Significantly, it should be noted that the controller is specified in terms of input-output variables common to any technology. One example of input-output variables is output power.

A nonlinear controller design capable of meeting input-output power specifications is based upon using the transformed state space which recognizes the general form of any components such as electrical machines (generators, loads) and solar power PV resources. This general model is as follows:

$$\frac{d\bar{x}_i(t)}{dt} = f_i(\bar{x}_i, u_i, m_i)$$

$$\frac{dz_i(t)}{dt} = f_i(\bar{x}_i, z_i, u_i, m_i)$$

in which:

subscript i is an index and denotes the $i^{th}$ component of a plurality of components (e.g. i=1 to N where N is the number of components).

$$m_i = \left[ p_{j,i}(t), \frac{dPj, i(t)}{dt} \right] j \in [C_i]$$

is the disturbance seen by component i, $z_i(t)$ is the transformed state variable defined as $z_i(t) = [E_i(t), P_{ei}(t)]^T$ $E_i(t)$ is the stored energy of component i $P_{ei}(t)$ is the controllable electrical power output of component i $z_i(t)$ is the interaction variable $C_i$ is a set of all components to be connected to component i.

It should be noted that j also refers to the local disturbance that belongs to node i.

A nonlinear controller design of a stand-alone component becomes the problem of local control design so that input-output specifications stated above (i.e. setting plug-and-play specifications in terms of common variables) are met. This is a highly nonlinear, disturbance rejection control problem since power and rate of change of power are nonlinear functions of physical state variables. Meeting ranges of terminal voltage specifications is also part of nonlinear control design.

The derived control law makes closed-loop dynamics of the component a linear dynamics which is stabilizable for a given range of physical control inputs.

Referring now to FIG. 4, illustrates a general block diagram for designing such control. Examples of such control law for power electronics controlled PV, and synchronous machine are shown in FIGS. 4A and 4B, respectively.

FIG. 4 shows required signals for implementing general control needed to meet I-O specifications. It can be seen that sensed and measurement data are disturbances m, ṁ, and the voltage measured at the terminal of a component V. Also, measurements are used to provide interaction variable z and remaining internal states $\bar{x}$. An illustrative, general, two-layer controller design is shown to respond to desired reference signals $V^{ref}$ and $P_e^{ref}$.

In this illustrative embodiment, layer 1 is the dynamic energy layer which, based on these signals, computes required total electrical power so that $P_e^{ref}$ is achieved and also the terminal voltage is maintained close to a reference voltage $V^{ref}$. Layer 2 utilizes a reference power $P^{ref}$ and estimated signals based upon the measurement to compute a nonphysical feedback signal v. This signal is computed so that closed loop real power dynamics is directly controlled by v. Next, this nonphysical feedback signal is transformed into a physical feedback signal u which is directly applied to the physical plant. When control saturation is reached, the limiting value of control is implemented.

As examples of this general closed loop controller of any standalone component, shown in FIGS. 4A and 4B are its applications to novel control of a synchronous machine and solar PV, respectively. Shown in these figures are state variables and control signals specific to these components. It can be seen that the systems illustrated in FIGS. 4A and 4B follow directly from the systems and techniques described in conjunction with FIG. 4.

It can be seen that all these controllers share common design approach which rests on the following concepts: (a) in the transformed state space, one of the physical state variables (rotor currents in an electrical machine and current coming out of solar panels) are replaced by the output electrical power. (b) the control $v_i(t)$ is designed so that in closed loop the output power depends linearly on the deviations in power from the power requested from the rest of the system. This determines the value of controlled power to be produced by the component in response to this deviation. (c) In addition, this power produced gets updated so that the energy stored in the rest of the component maintains terminal voltage of the component close to the desired nominal value. (d) The rate of change of the electrical power output is limited by the limits on physical control $u_i^{min} < u_i(t) < u_i^{max}$ and depends on the bounds on disturbance $m_i(t)$ to which the controller is expected to respond.

Figure 1:
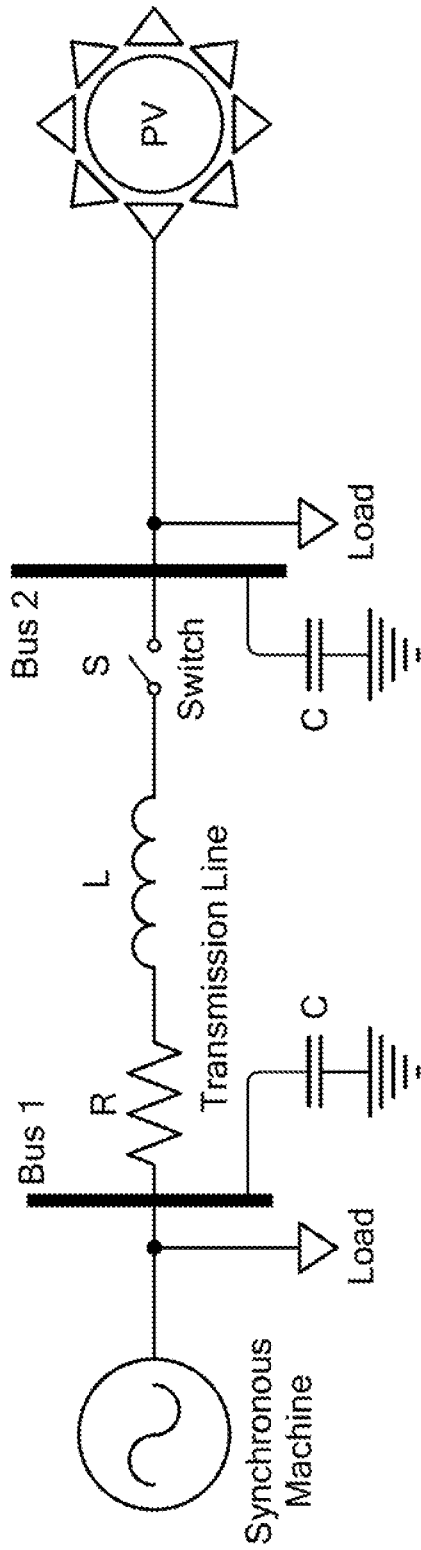
FIG. 1 is a block diagram of a prior art stand-alone microgrid.
Figure 1A:
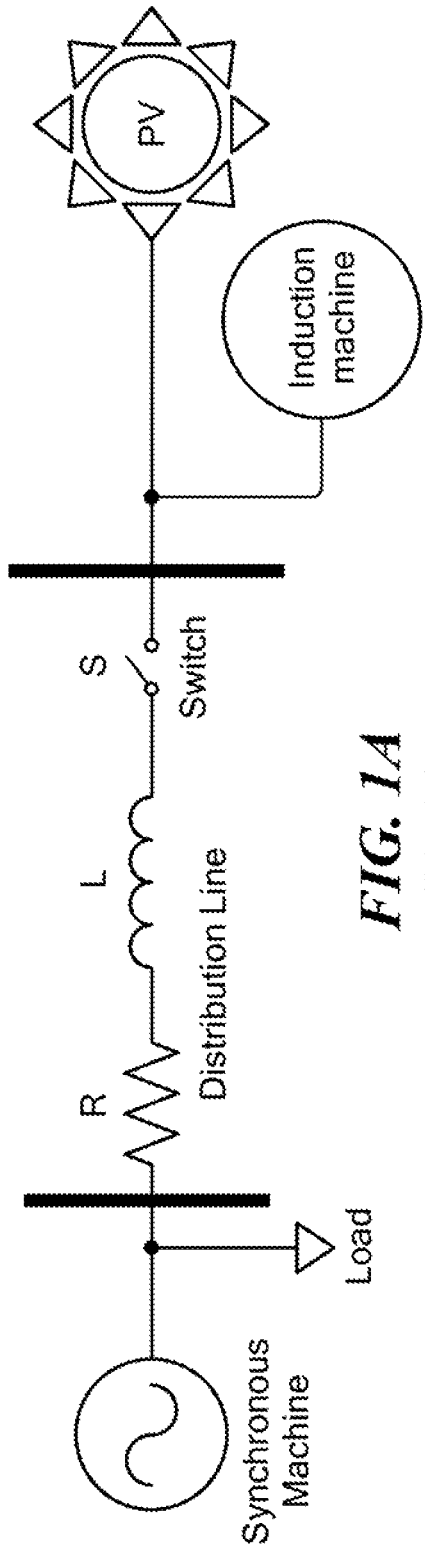
FIG. 1A is a block diagram of a prior art stand-alone microgrid
Figure 2:
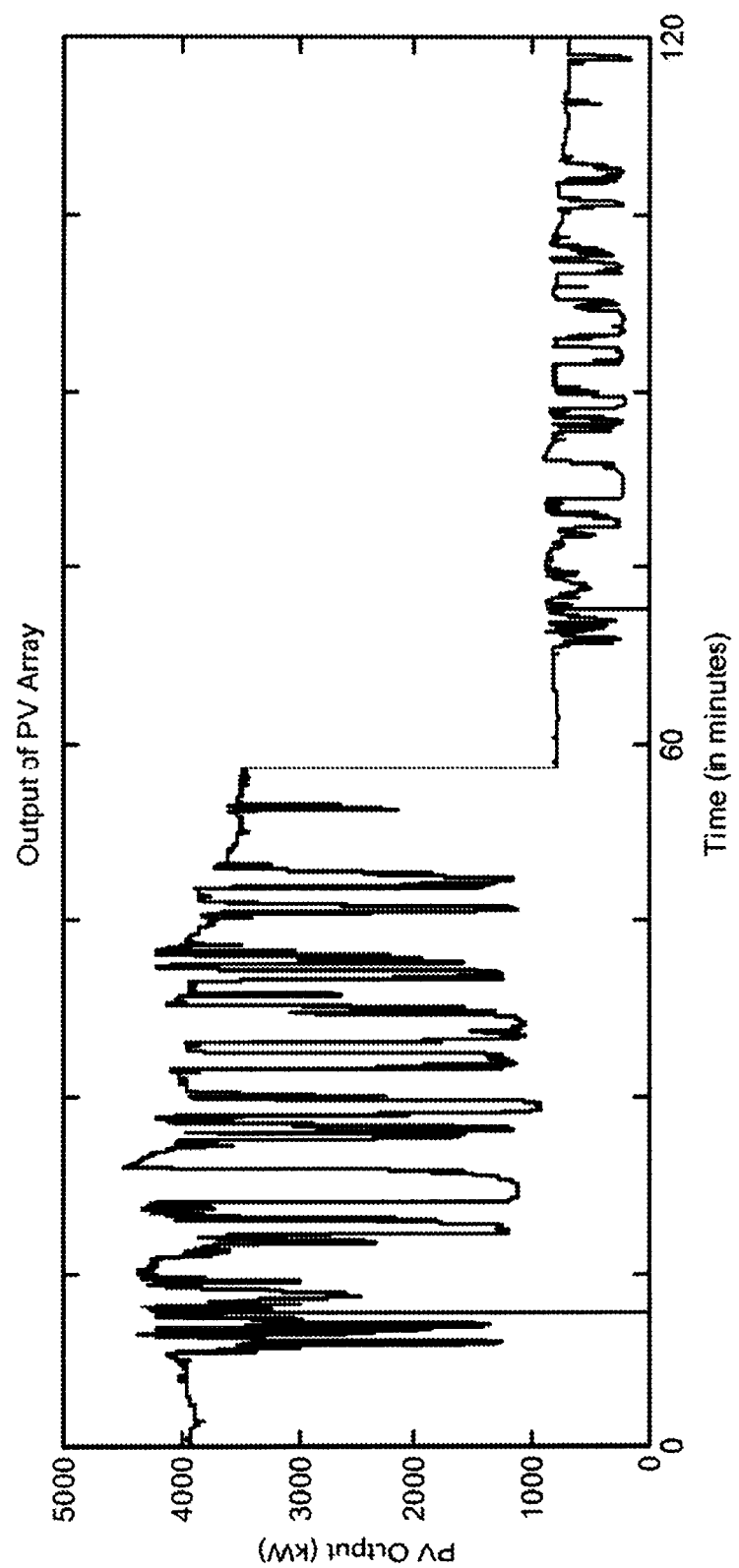
FIG. 2 is a plot of PV output vs. time which illustrates a typical solar radiation profile.
Figure 9:
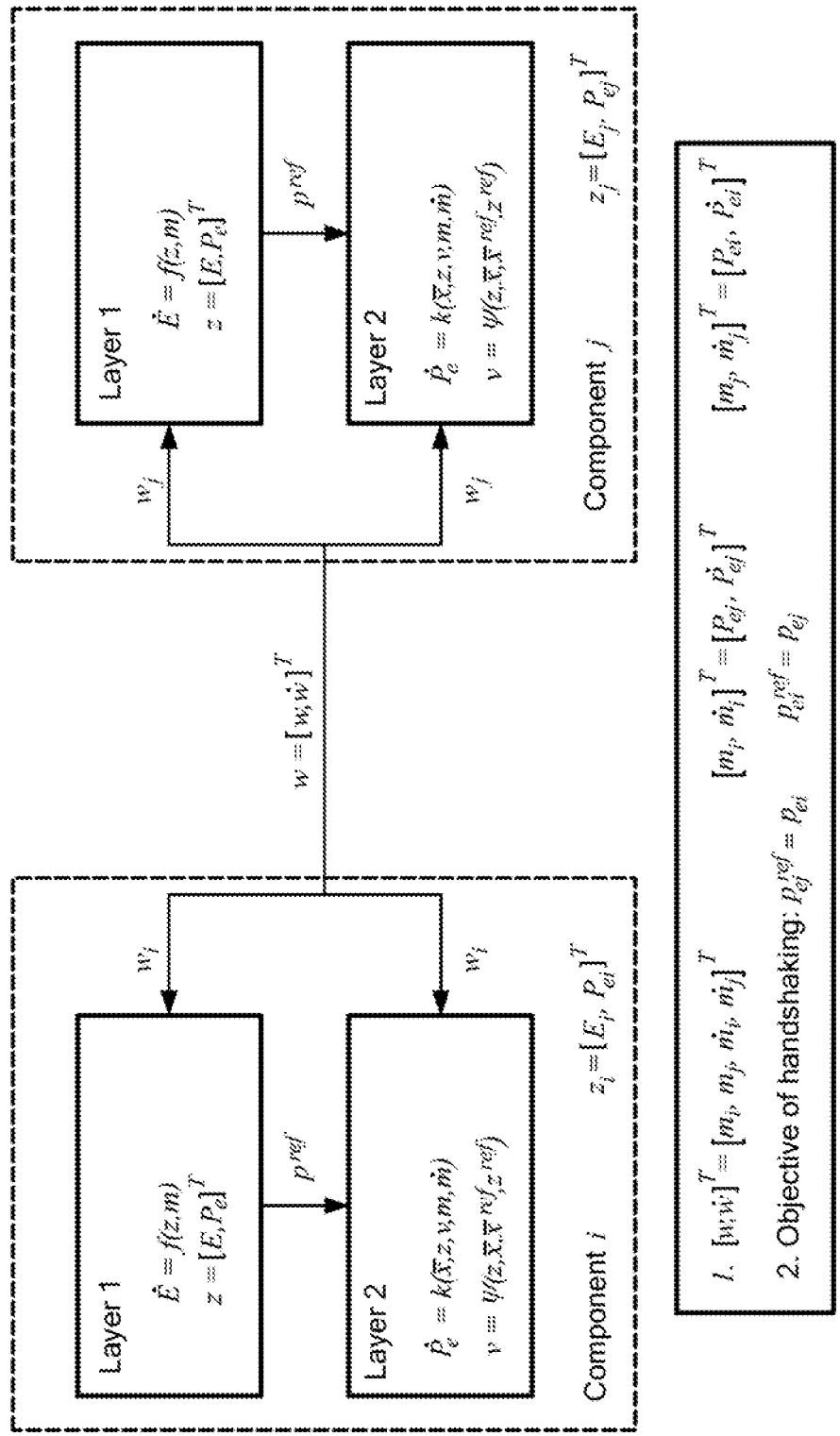
FIG. 9 is a block diagram of a 'handshaking' structure.
Figure 9A:
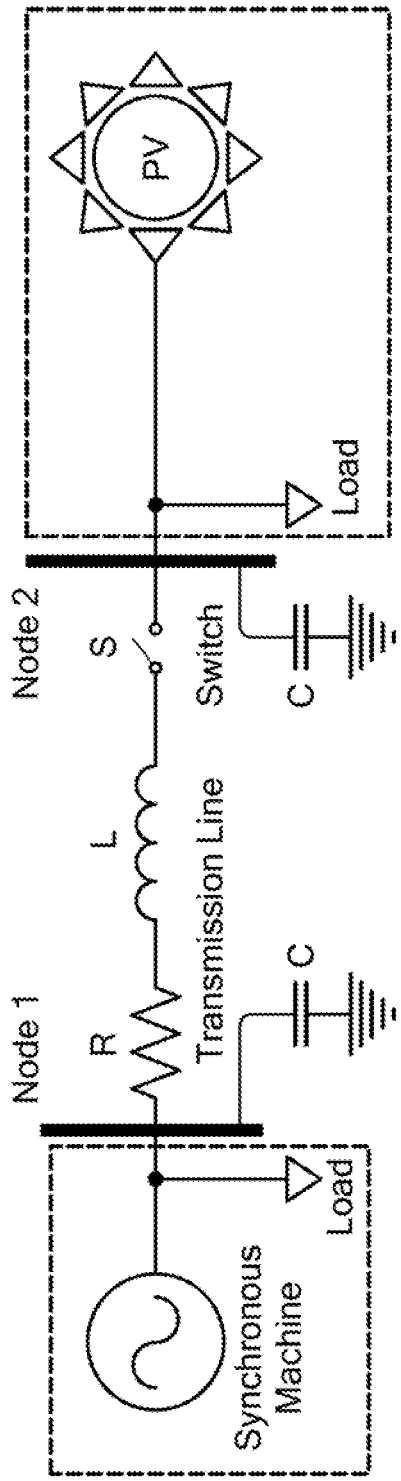
FIG. 9A is a block diagram of a microgrid comprising heterogenous components including a controllable synchronous machine and a controllable photo-voltaic (PV) panel having a local load connected to a utility.
Figure 9B:
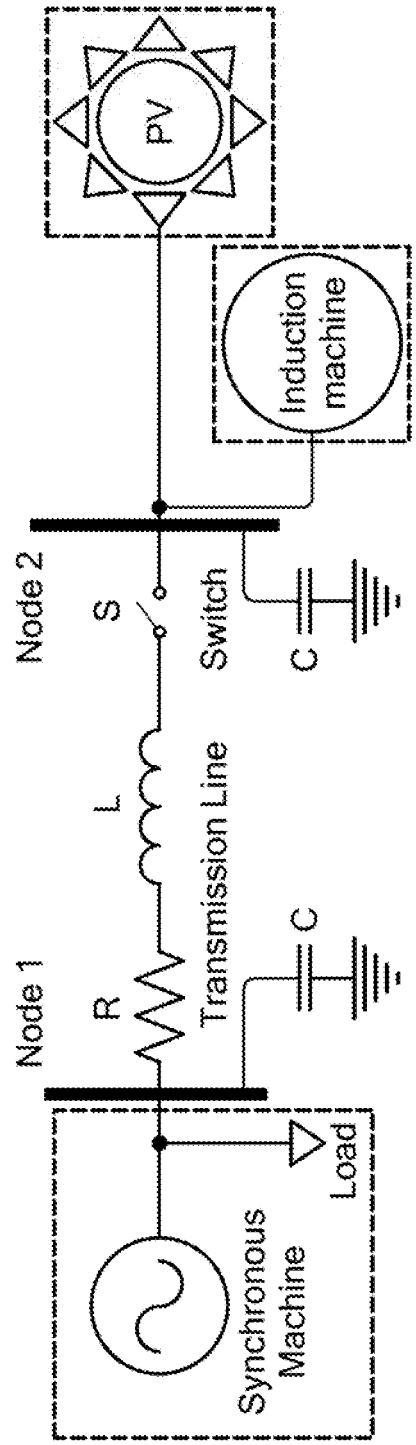
FIG. 9B is a block diagram of a stand-alone microgrid comprising heterogenous components including a controllable synchronous machine having a local load connected thereto, a controllable induction machine and a controllable photo-voltaic (PV) panel.

The illustrative microgrids shown in FIGS. 9 and 9A are used to show proof-of-concept of the above-described control design. The microgrids of FIGS. 9A, 9B are similar to the microgrids of FIGS. 1, 1A except that the synchronous machine, PV panel and indication machine (FIG. 9B) are now provided as a controllable components. It should also be noted that one load is grouped with the synchronous machine (as indicated by the dashed lines) and one load is grouped with the PV panel (as indicated by the dashed lines). Thus, in this example, the loads are considered as part of the controllable component. In other embodiments, either or both of the loads may be not be considered as part of a controllable component.

In the test microgrid systems, a 4 MW synchronous generator is used to represent a utility grid. Two constant impedance loads are located at Bus 1 and Bus 2 respectively. A typical solar farm is connected to a transmission line module (e.g. through a three-phase DC/AC inverter). System parameters are listed in the following tables.

TABLE 1

| Parameters of 4 MW Synchronous Generator | | | | | | | | | | | |
|---|---|---|---|---|---|---|---|---|---|---|---|
| $H_{SM1}$ | $D_{SM1}$ | $L_{ad.SM1}$ | $L_{af.SM1}$ | $L_{aq.SM1}$ | $L_{df.SM1}$ | $L_{Sd.SM1}$ | $L_{Sq.SM1}$ | $R_{S.SM1}$ | $R_{R.SM1}$ | $R_{kd.SM1}$ | $R_{kq.SM1}$ |
| 0.3222 | 0.0132 | 2.81 | 2.81 | 1.64 | 2.81 | 2.89 | 1.72 | 0.0152 | 0.0043 | 0.2343 | 0.0337 |

TABLE 2

| Parameters of PV System | | | |
|---|---|---|---|
| $R_{f.PV2}$ | $L_{f.PV2}$ | $C_{f.PV2}$ | $I_{DC.PV2}$ |
| 0.0069 | 0.9425 | 0.0921 | 0.9 |

TABLE 3

| Parameters of Equivalent load at Bus 1 and Bus 2 | | | |
|---|---|---|---|
| $R_{SM}$ (pu) | $L_{SM}$ (pu) | $R_{PV}$ (pu) | $L_{PV}$ (pu) |
| 0.5587 | 0.4054 | 4.9098 | 2.8962 |

TABLE 4

| Parameters of Transmission Line | | |
|---|---|---|
| R (pu) | L (pu) | C (pu) |
| 0.0287 | 0.1144 | 0.01 |

There are two scenarios considered here: The first scenario is to test the effectiveness of the proposed control against disturbance. This is conducted through a simulation with an initial condition 5% away from the normal operating point. Dynamic responses of closed loop synchronous generator and PV dynamics with proposed controllers are shown in FIGS. 5, 5A, 7 and 7A, respectively.

The second scenario is to test the proposed control against a sudden topology change. The PV system is disconnected from the utility grid by opening switch S at 0.3 secs. Corresponding dynamics responses of synchronous generator and PV system are shown in FIGS. 6, 6A, 8 and 8A, respectively.

Figure 5:
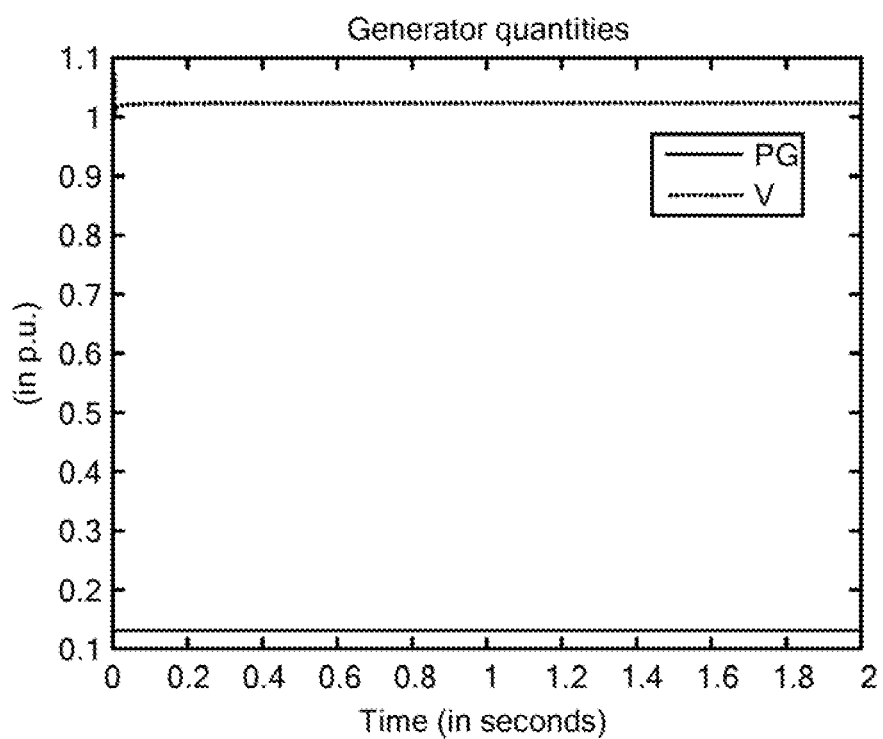
FIG. 5 is a plot of per unit value of power generation and terminal voltage) vs. time for a synchronous machine response to disturbance in power away from equilibrium.
Figure 5A:
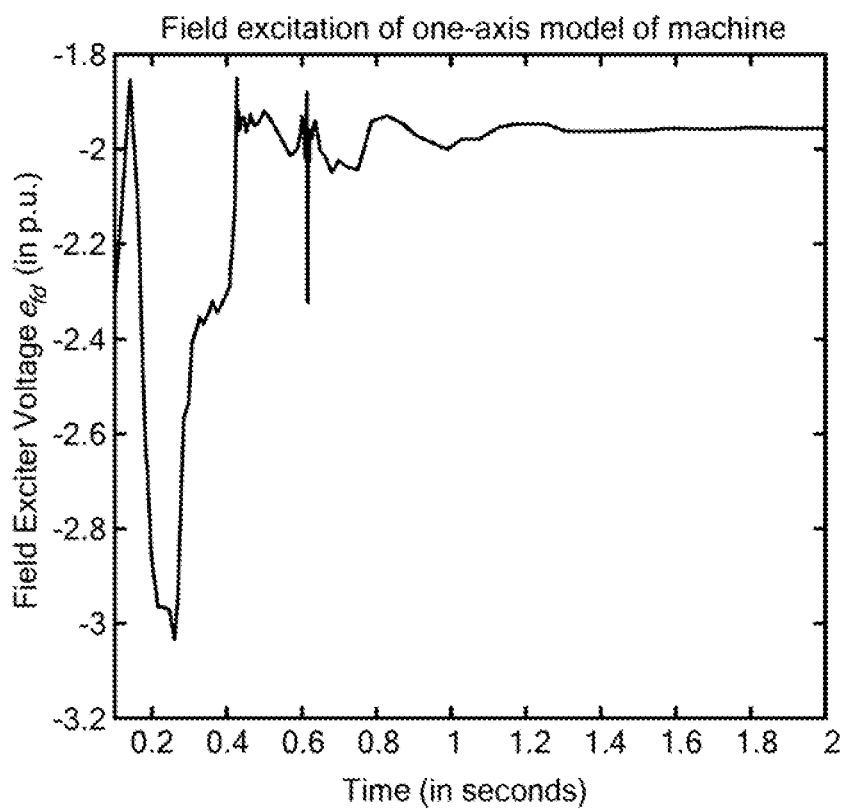
FIG. 5A is a plot of field excitation vs. time for a synchronous machine response to disturbance in power away from equilibrium.

FIGS. 5 and 5A illustrate a closed loop response of a diesel generator to disturbance in power away from the equilibrium (FIG. 5), and a required nonlinear control (field excitation) to stabilize the output power to the set specification (FIG. 5A).

Figure 6:
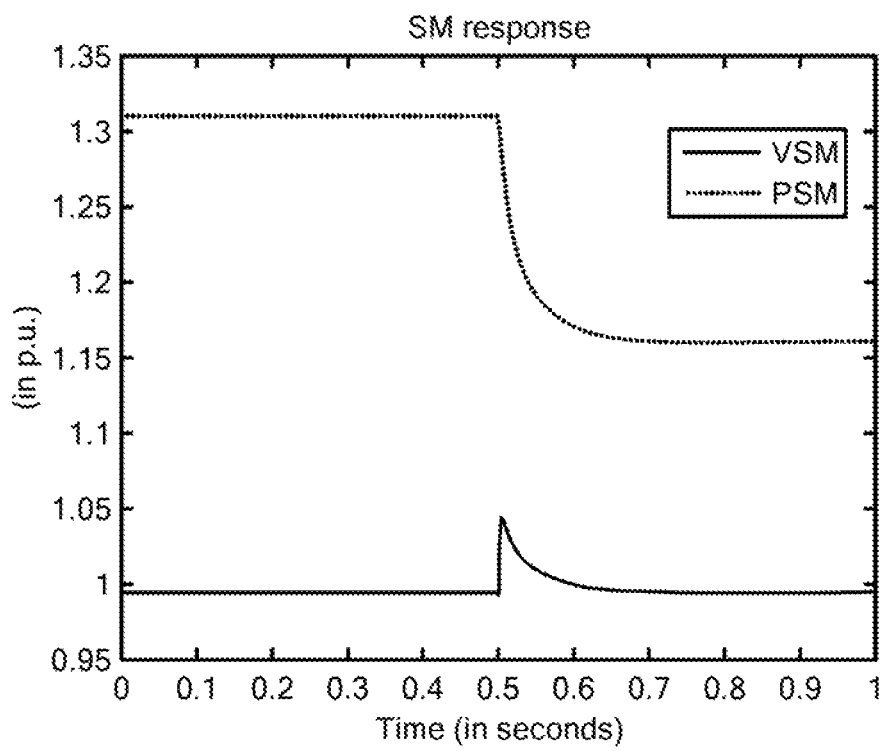
FIG. 6 is a plot of per unit value of power generation and terminal voltage vs. time for a synchronous machine response to opening switch S.
Figure 6A:
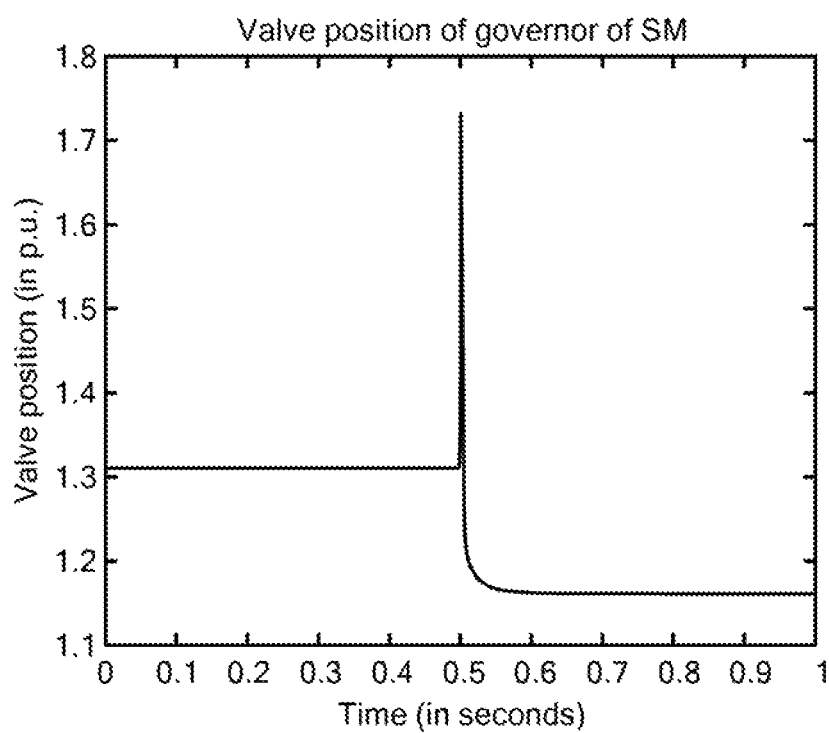
FIG. 6A is a plot of valve position vs. time for a synchronous machine response to opening switch S.

FIGS. 6 and 6A illustrate a response of a synchronous machine (SM) to a fault (e.g. opening switch S in FIGS. 9A, 9B) (FIG. 6) and the corresponding control (e.g. valve position) needed to stabilize the response to the same power range (FIG. 6A).

Figure 3:
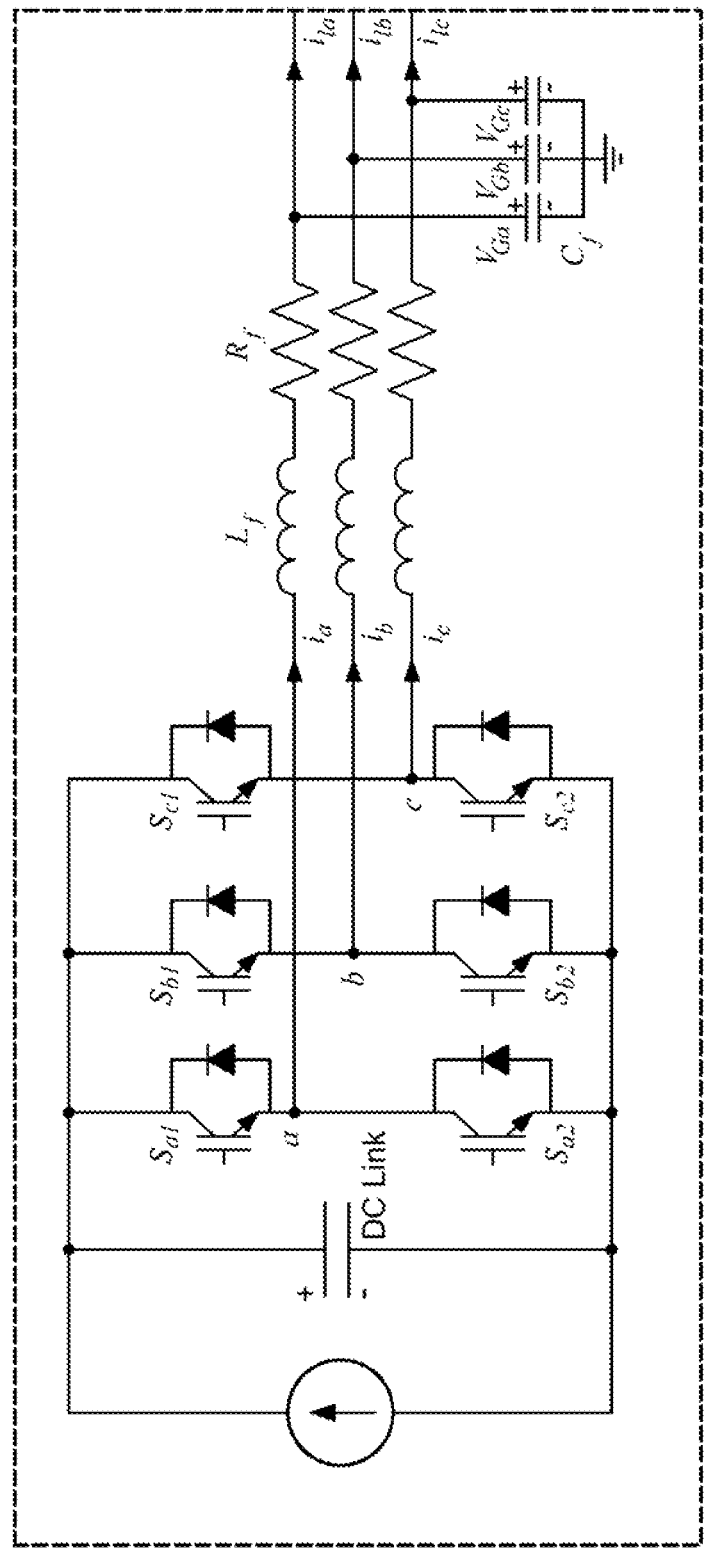
FIG. 3 is a schematic diagram of prior art PV inverter topology.
Figure 7:
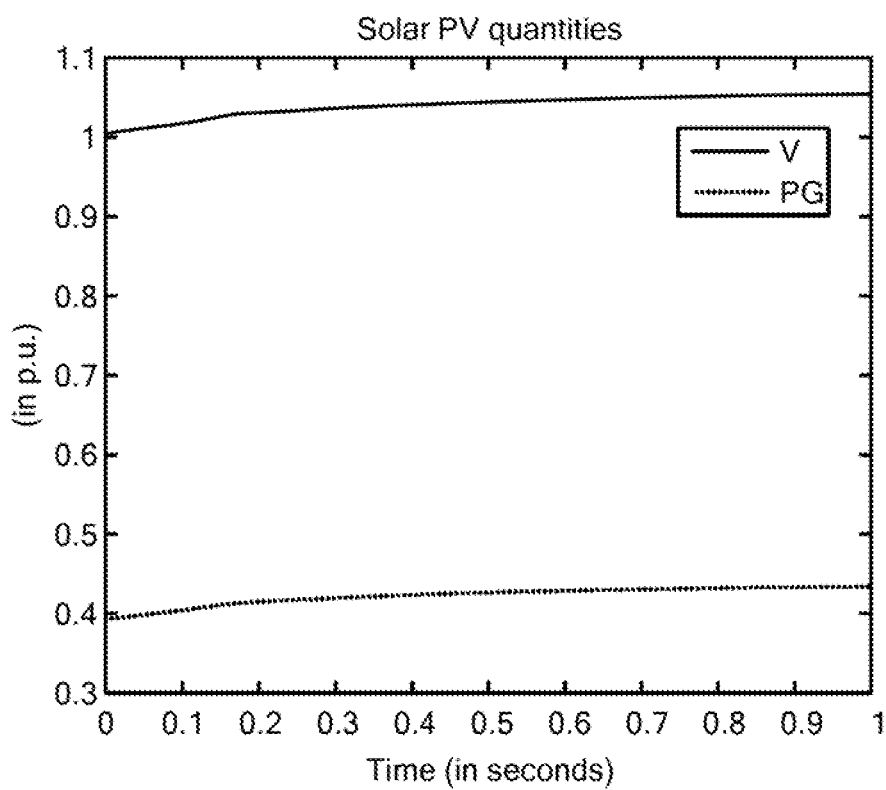
FIG. 7 is a plot of per unit value of power generation and terminal voltage vs. time which illustrates a solar PV response to disturbance in power away from equilibrium.
Figure 7A:
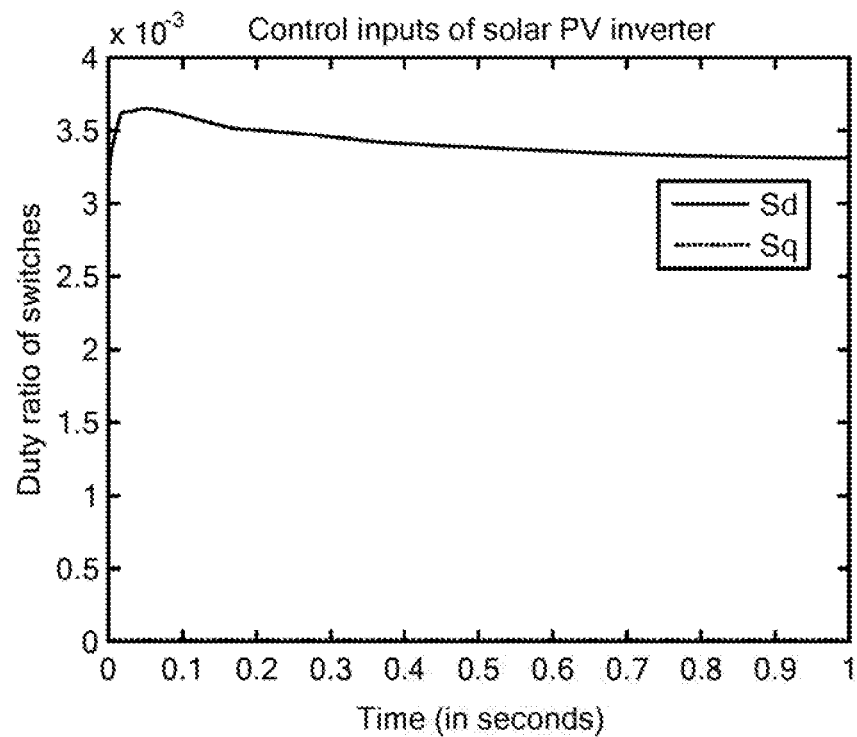
FIG. 7A is a plot of duty ratio of switches vs. time for control inputs of a solar PV inverter.

FIGS. 7 and 7A illustrate a closed loop response of a PV to a local disturbance in power away from the equilibrium (FIG. 7) and the required control response (e.g. duty ration of switches in a PV inverter such as those shown in FIG. 3).

Figure 8:
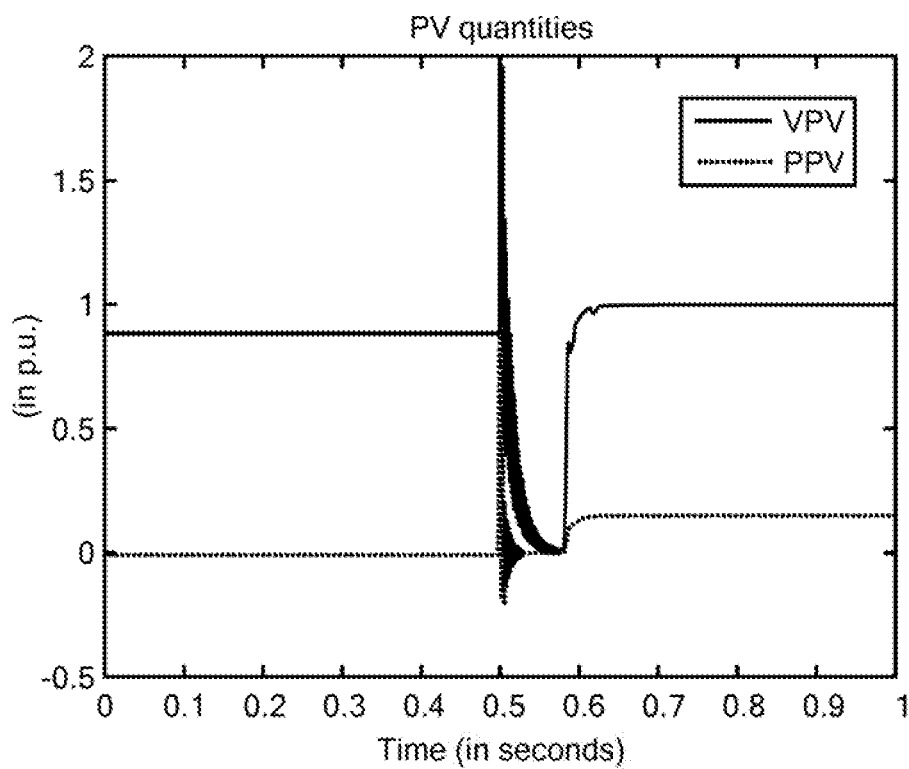
FIG. 8 is a plot of per unit value of power generation and terminal voltage vs. time which illustrates a PV response to opening switch S.
Figure 8A:
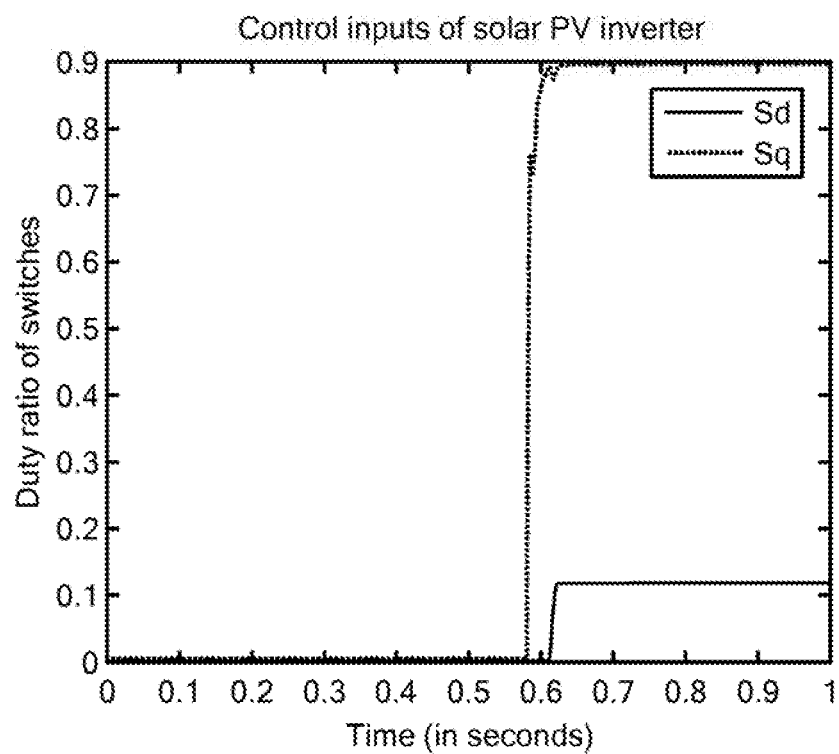
FIG. 8A is a plot of duty ratio of switches vs. time control inputs of a solar PV inverter.

FIGS. 8 and 8A illustrate a response of a PV (FIG. 8) (e.g. a PV such as that shown in FIGS. 9A, 9B) to a fault (e.g. opening switch S in FIGS. 9A, 9B) and the corresponding control (e.g. duty ratio of switches in a PV inverter such as those shown in FIG. 3) needed to stabilize the response so that the remaining system supplies the local load at the initial power (FIG. 8A).

Next described are distributed adjustments of components in an interconnected grid.

Referring now to FIG. 9, shown is information exchange between controllable components (i.e. components controllable in accordance with the techniques described herein) when they are interconnected. It should be appreciated that a solution exists for the ranges of disturbances specified when designing and testing standalone controllable components. In this case controllable component i can be shown to stabilize in response to disturbances $m_i(t)$ which can be caused by either neighboring components or by local disturbances in power of the load.

For the sake of simplified discussion, assume that the local load does not change and that the power changes created by the component j (which may itself be a controllable component) are in the range specified output power when tuning stand-alone component i. Recall that this component was tuned to stabilize in response to the range of disturbances $m_i(t)$, therefore it can stabilize in a distributed manner by exchanging the information about the actual deviations in power outputs from component j. Therefore, all that is needed is to exchange the information about the power changes and the rate of change of power with neighboring components (e.g. neighboring controllable components).

As long as the components are only expected to operate within the power inputs/outputs defined at the component design stage the interconnected system will stabilize through "handshaking" shown in FIG. 9.

Figure 10:
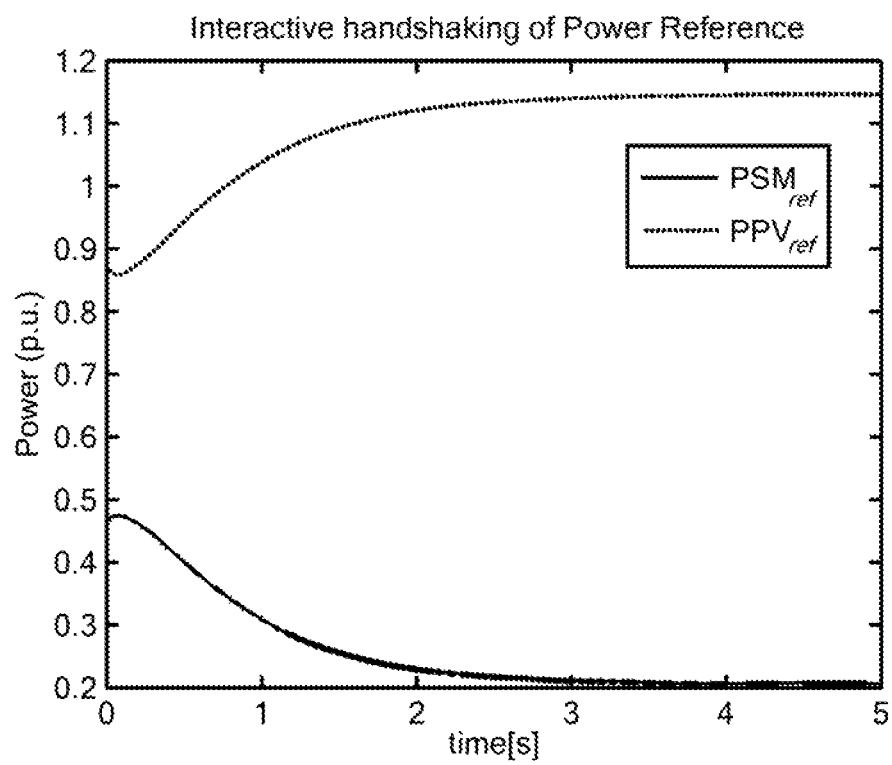
FIG. 10 is a plot of power vs. time for a simulation on interactive handshaking for stabilizing interconnected network for change in operating conditions.
Figure 10A:
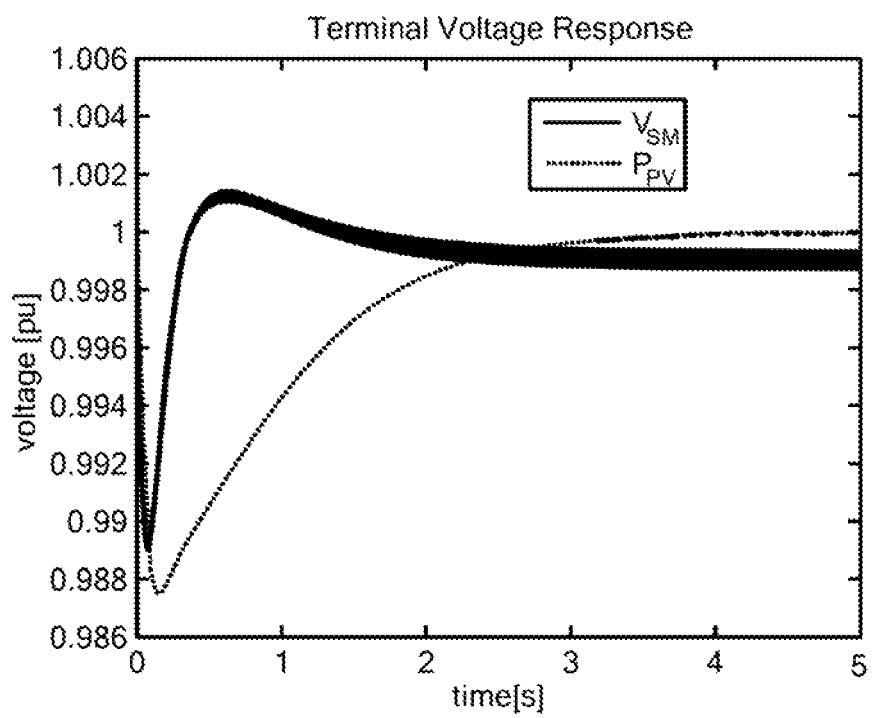
FIG. 10A is a plot of voltage vs. time illustrating a terminal voltage response for the simulation on interactive handshaking for stabilizing interconnected network for change in operating conditions shown in FIG. 14.

To show the concept, as the first step, a test system shown in FIG. 9A is considered. Simulation starts from an arbitrary initial condition with no information on set points or equilibrium. As shown in the result FIGS. 10 and 10A, this cooperative information exchange between components leads to finding system equilibrium in an interactive way where FIG. 10 illustrates interactive handshaking of the power reference and FIG. 10A illustrates a terminal voltage response.

Furthermore, this cooperative information exchange also works when sudden system topology change occurs. The test system shown in FIG. 9B is considered. Topology change fault is simulated by opening switch S at 5 secs and then close at 10 secs. Compared with the system in FIG. 9A, constant impedance load at Bus 2 is replaced with an induction machine, having parameters listed in Table 5.

TABLE 5

Parameters of Induction Machine

| $B_{IM2}$ | $J_{IM2}$ | $L_{S\_IM2}$ | $L_{SS\_IM2}$ | $L_{R\_IM2}$ | $L_{RR\_IM2}$ | $M_{IM2}$ | $\tau_{L\_IM2}$ | $v_{DC\_IM2}$ |
|---|---|---|---|---|---|---|---|---|
| 0.0117 | 0.1283 | 1.6729 | 2.4393 | 1.6729 | 2.4393 | 1.6262 | 0.0465 | 0.9813 |

Figure 11:
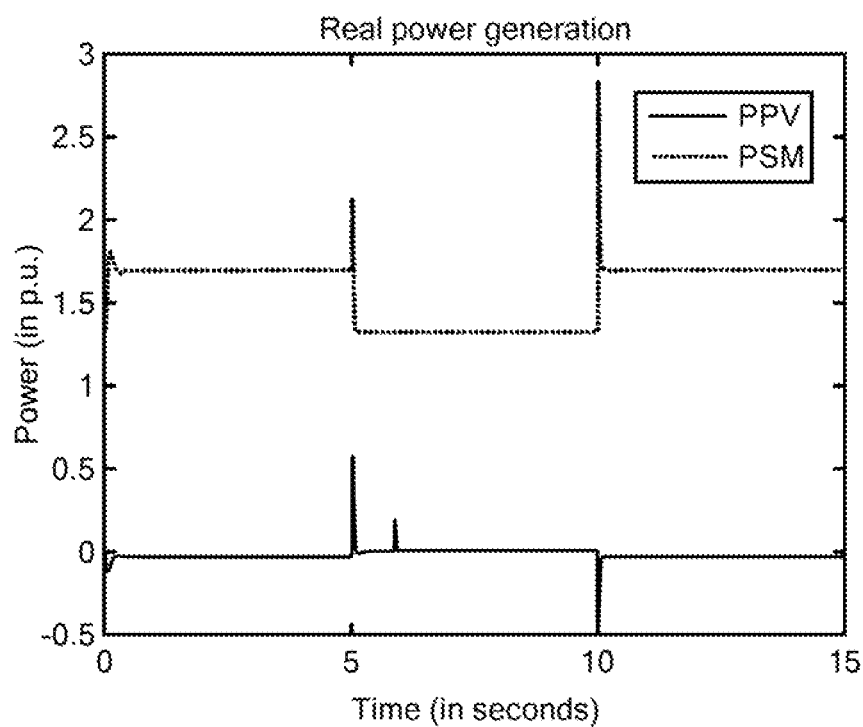
FIG. 11 is a plot of power vs. time for a control designed using Interactive handshaking for topology change.
Figure 11A:
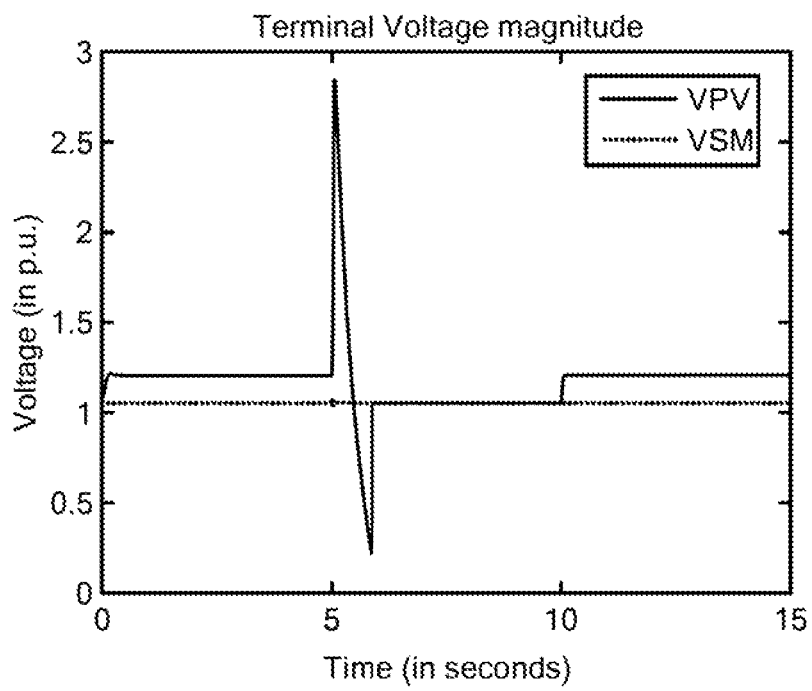
FIG. 11A is a plot of voltage vs. time illustrating a terminal voltage response for the control designed using Interactive handshaking for topology change shown in FIG. 15.

As shown in FIGS. 11 and 11A, this cooperative information exchange between components could lead to finding system equilibrium in an interactive way even under topology change fault. During the fault period, power set points are interactively adjusted so that system is stable and terminal voltage is maintained within feasible region.

It is observed that, depending upon the relative rate of change of disturbances for which individual components are expected to respond, many specific implementations of handshaking methods would be possible. For example, one could have slower, discrete time information exchange in a microgrid comprising one diesel generator and one PV shown in FIGS. 9A, 9B if the SM only has enough physical control to respond within certain rate of power change. On the other hand, a similar handshaking principle would require much faster information exchange in a system with two PVs. These proof-of-concept simulations show that the proposed nonlinear controller fully stabilizes voltage close to nominal value and also regulates power to the value set.

Notably, this implementation does not require centralized microgrid controller for on-line control implementation as long the ranges of power outputs are pre-specified and units are tested prior to putting it into operations.

Next described is a minimally coordinated microgrid controller.

It is possible to rethink today's hierarchical control using the transformed state space. Shown in FIGS. 11 and 11A is a sketch of today's hierarchical control for microgrids. In short, when one assembles a microgrid from scratch, or attempts to integrate large amounts of PVs, it quickly becomes clear that the system may not even have a feasible solution within the given operating specifications on frequency and voltage. The reasons for this could be multi-fold and are straightforward to understand from FIGS. 11 and 11A. Tertiary controller schedules power and voltage set points for given ranges of power and voltage at loads. However, loads in particular do not have voltage control and this may create the operating problem that leads to low-voltages, etc. On the other hand, even diesel generators and PVs are not tuned today to ensure that the set points given by the microgrid controller can be implemented (in other words today's primary controllers are not capable of operating in the manner described above). This creates a major problem which requires adjustments in set points to which secondary and primary controllers can respond in a stable way.

This leads to the question as to whether there may be a benefit from coordinating components capable of meeting specifications described above instead of having hand-shaking distributed adjustments. It is fairly straightforward to prove that in the transformed state space power dispatch can be easily decomposed into power dispatch at the component levels, and these can be further implemented by using nonlinear controller described above. It is possible to show that because of voltage problems and the inability to give different priorities to different components regarding the needs for local control amounts, most generally minimally coordinated multi-layered controller in a transformed state space would be most optimal.

A multi-layered controller in transformed state space simply requires components to provide their specifications (as described above) and feed these to a microgrid controller which optimizes overall scheduling using only interaction variables and not having to go into the details of specific technologies of components. In some respects, this resembles today's economic dispatch and unit commitment, with the fundamental difference being that in accordance with the concepts, systems, devices and techniques described herein, the performance criteria are optimized in a look ahead manner, instead of in static manner.

In the case when not all components have local control, it becomes necessary to have secondary layer responsible for aggregating components so that they jointly can operate in accordance with the techniques described herein.

The above is in contrast to present (i.e. conventional) control techniques in which components are tuned for system specific worst-case conditions. Testing is done against static equivalent of the microgrid for certain ranges of load and topologies of interest. This procedure requires very involved tuning of constant gain controllers and tuning is typically sensitive to the operating conditions and disturbances. Also, coordination of components for ensuring feasible microgrid operation is hierarchical, and, it therefore requires centralized communications. Therefore, the control design is not fail safe when communication is lost. The control commands are generally mapped into set points for droops under major assumptions (linearization around the operating point is valid, no fast instabilities, voltage and power droops are decoupled, etc). All of this makes it hard to ensure that the microgrid will be providing power during extreme large changes.

Figure 12:
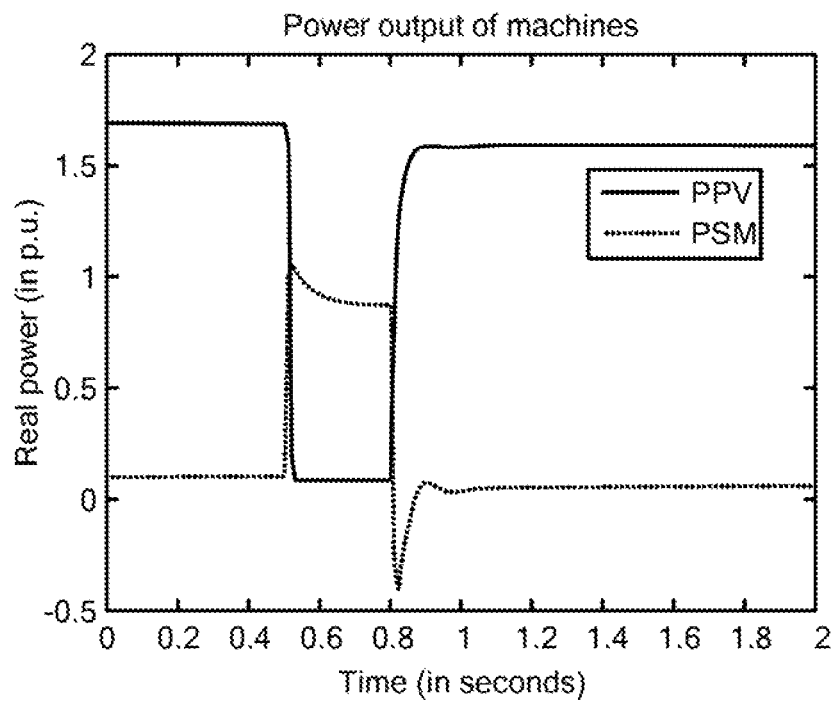
FIG. 12 is a plot of real power vs. time for both SoA control and topology change fault.
Figure 12A:
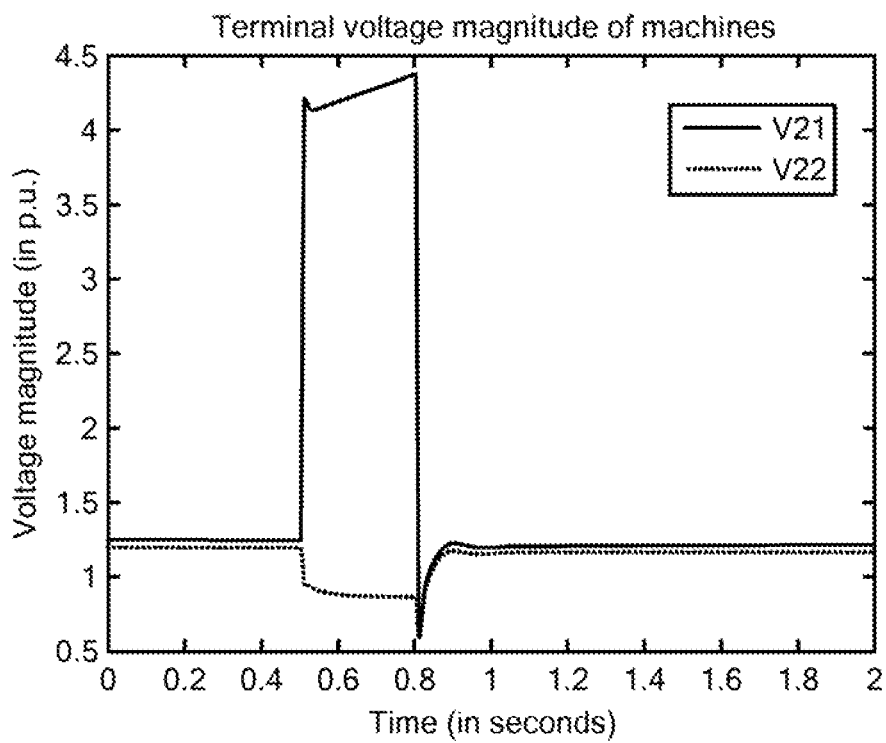
FIG. 12A is a plot of voltage magnitude vs. time for both SoA control and topology change fault.

FIGS. 12, 12A, illustrate a comparison of interconnected system response shown in FIGS. 11, 11A when applying conventional control techniques. It can be seen that in the event of a fault, the power going into the network decreases resulting in voltage overshoot. It has to be noted that the fault is cleared within 0.3 seconds which is why the system regains its equilibrium after reconnection. In addition, this response is obtained after tuning the proportional and integral gain controllers for a long time and it is evident that the gains tuned for the system in interconnected mode are not robust which leads to the overshoot of voltage during the disconnection period.

Figure 13:
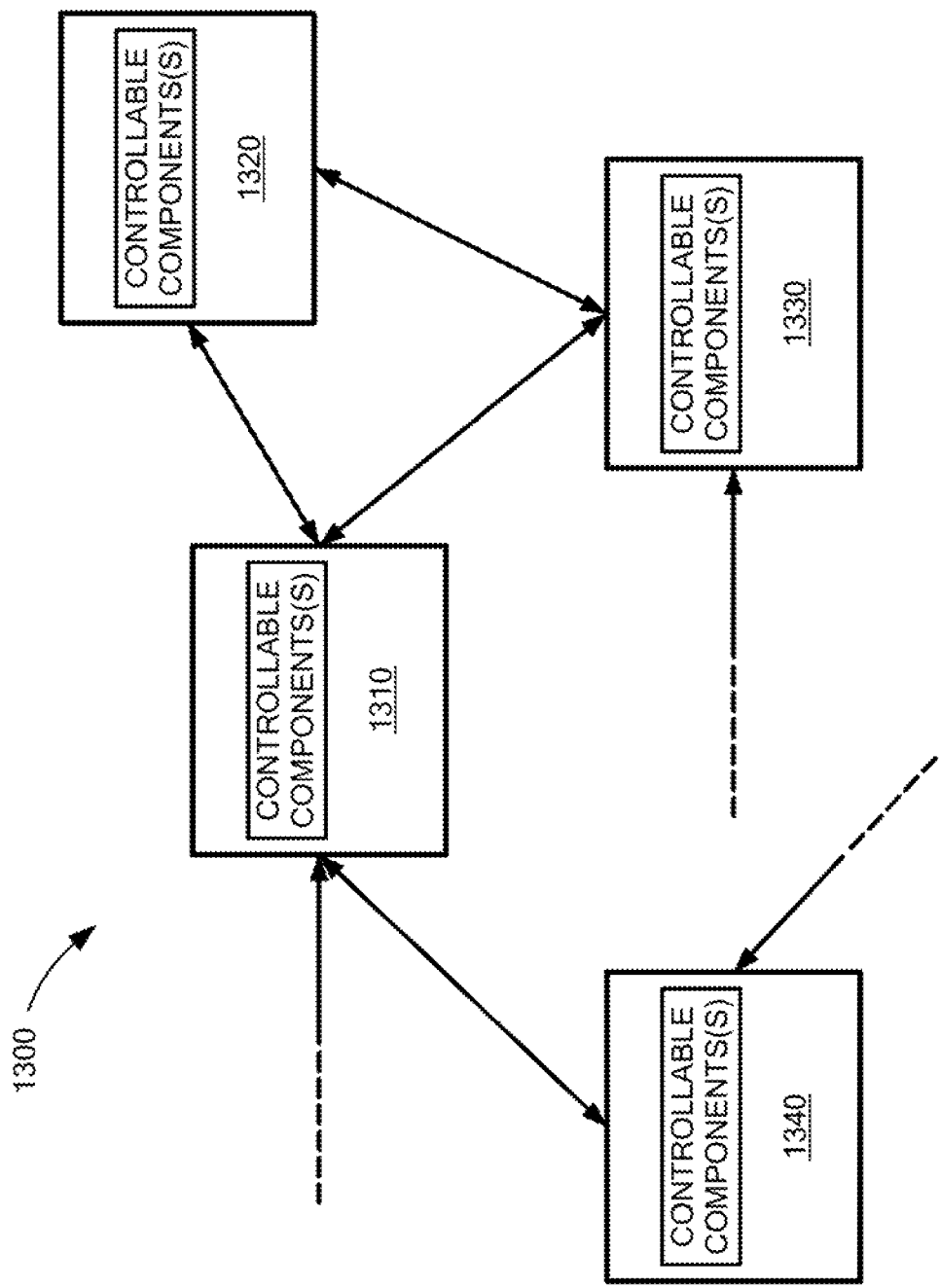
FIG. 13 is a block diagram illustrating a network of plug and play microgrids.

Referring now to FIG. 13 a plurality of microgrids 1310-1340 are coupled to form a network 1300 in which at least some of the plurality of microgrids include components controllable via the techniques described above in conjunction with at least FIGS. 4-4C. Each of the microgrids 1310-1340 may be the same as or similar to the microgrids described above in conjunction with FIGS. 9A, 9B.

The concepts described herein find use in a wide variety of applications including, but not limited to: designers of equipment, and system operators purposes of operating systems over wide ranges of changing conditions without experiencing reliability problems; in digital electronics, setting plug-and-play standards for integrating components into systems, could lead to major deployment of power electronics automation in future microgrids; manufacturers of renewable resources as a means of enabling higher deployment of renewable resources; load demand which has induction motors embedded (HVACs, water pumps, heat pumps) all can utilize nonlinear control proposed to participate in plug-and-play utilization; and organizations concerned with solutions for operating reconfigurable tactile microgrids.

Having described preferred embodiments, which serve to illustrate various concepts, structures and techniques, which are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

All publications and references cited herein are expressly incorporated herein by reference in their entirety.

What is claimed is:

1. A method of controlling a component which receives an input signal and produces an output signal comprising:
    (a) in response to a change in the input signal, generating a first value corresponding to a disturbance value (m), a second value corresponding to a rate of change to the disturbance value (m), a third value corresponding to a second voltage quantity ($V_q$);
    (b) in response to receiving the first, second, and third values:
        (b1) generating a reference power point ($p^{ref}$) corresponding to an amount of power to be produced to maintain a voltage within a predetermined voltage range about a reference voltage ($V^{ref}$); and
        (b2) generating a feedback signal $\mathcal{V}$ needed to stabilize electrical power produced by the component to produce the value of the reference power point $p^{ref}$.

2. The method of claim 1 further comprising detecting a change in the input signal.

3. The method of claim 2 wherein detecting a change in an input signal comprises sensing a change in an input signal with a sensor.

4. The method of claim 1 further comprising:
    mapping the feedback signal $\mathcal{V}$, the state variable x, and the disturbance value (m) to provide a physical control signal (u).

5. The method of claim 4 wherein in response to receiving a computed physical control signal (U), determining actual ranges of $p^{ref}$, $v^{ref}$ over which control can be maintained.

6. The method of claim 5 further comprises:
    in response to the physical control signal (U) having a value between a minimum value ($U_{min}$) and a maximum value ($U_{max}$), applying control values to the components; and
    in response to the physical control signal (U) having a value which is not between the minimum value and the maximum value, then applying one of the minimum value and the maximum value.

7. The method of claim 4 wherein the component is a synchronous machine and the physical control signal is an excitation signal.

8. The method of claim 4 wherein the component is an inverter-interfaced component and the physical control signal is an inverter control signal.

9. The method of claim 8 wherein the inverter-interfaced component is an inverter-interfaced photovoltaic (PV) component.

10. The method of claim 4 wherein the component comprises an induction motor and the physical control signal is a pulse train.

11. The method of claim 4 wherein the component is a storage system.

12. A method of controlling a component which receives an input signal and produces an output signal, the method comprising:
    (a) in response to a change in the input signal, generating a first value corresponding to a disturbance value (m), a second value corresponding to a rate of change to the disturbance value (m), a third value corresponding to a second voltage quantity ($V_q$);

(b) in response to receiving the first, second, and third values:
  (b1) producing a value $p^{ref}$ corresponding to a desired reference electrical power produced by the component with the desired reference electrical power being within a range of desired electrical powers while concurrently maintaining a terminal voltage ($v_t$) of the component within a range of terminal voltages; and
  (b2) in response to receiving the reference electrical power value ($p^{ref}$), producing a feedback signal ($\mathcal{V}$) having a value which stabilizes electrical power output by the component to produce the reference electrical power value ($p^{ref}$).

13. The method of claim 12 further comprising:
  (a) detecting a change in an input signal; and
  (b) repeating (a) and (b) to form an auto-tune control method.

14. A system for controlling a component, the system comprising:
  (a) a sensing measurement system disposed to sense and measure characteristics input and/or output[s] to/from the component; and in response the measured characteristics, the sensing and measurement system produces at least two voltage values ($v_d$, $v_g$), a disturbance value (m) and a rate of change of disturbance value ($\dot{m}$); a state variable (z) of the component in state space and at least one observed state of the component (x);
  (b) a controller coupled to said sensing and measurement system, said controlled configured to receive signals provided thereto from said sensing and measurement system and in response to the signals produced by said sensing and measurement system, said controller generates a feedback signal ($\mathcal{V}$) having a value which stabilizes electrical power produced by the component to produce a desired reference power point ($p^{ref}$).

15. The system of claim 14 wherein said controller comprises:
  (a) a dynamic energy process (i.e. the first layer) configured to receive voltage values ($v_d$, $v_g$), a disturbance value (m) and a rate of change of disturbance value ($\dot{m}$), a state variable (z) of the component in state space and at least one observed state of the component (x) and in response thereto, to generate a reference power point ($p^{ref}$) corresponding to an amount of power to be produced to maintain a voltage within a predetermined voltage range about a reference voltage ($V^{ref}$); and
  (b) an active power processor (i.e. the second layer) configured to receive voltage values ($v_d$, $v_g$), a disturbance value (m) and a rate of change of disturbance value ($\dot{m}$), a state variable (z) of the component in state space and at least one observed state of the component (x) and in response thereto to generate a feedback signal $\mathcal{V}$ needed to stabilize electrical power produced by the component to produce the value of the reference power point $p^{ref}$.

16. The system of claim 15 wherein the component corresponding to one of:
  (1) a solar photovoltaic (PV) system;
  (2) a storage system;
  (3) a synchronous machine;
  (4) an induction machine; and
  (5) an inverter interfaced component.

* * * * *

UNITED STATES PATENT AND TRADEMARK OFFICE
CERTIFICATE OF CORRECTION

Page 1 of 1

PATENT NO. : 10,656,609 B2
APPLICATION NO. : 15/965823
DATED : May 19, 2020
INVENTOR(S) : Marija D. Ilic et al.

It is certified that error appears in the above-identified patent and that said Letters Patent is hereby corrected as shown below:

In the Specification

Column 1, Lines 16-18 delete "This invention was made with Government support under Contract No. FA8702-15-D-0001 awarded by the U.S. Air Force. The Government has certain rights in this invention." and replace with --This invention was made with government support under DE-AR0000747 awarded by the U.S. Department of Energy and FA8702-15-D-0001 awarded by the U.S. Air Force. The government has certain rights in the invention.--.

Signed and Sealed this
Seventh Day of February, 2023

Katherine Kelly Vidal
*Director of the United States Patent and Trademark Office*